(12) United States Patent
Zhou et al.

(10) Patent No.: US 11,626,905 B2
(45) Date of Patent: Apr. 11, 2023

(54) USING DIFFERENT ANTENNA PANELS ACROSS TRANSMISSIONS

(71) Applicant: QUALCOMM Incorporated, San Diego, CA (US)

(72) Inventors: Yan Zhou, San Diego, CA (US); Qian Zhang, Basking Ridge, NJ (US); Tao Luo, San Diego, CA (US); Junyi Li, Fairless Hills, PA (US); Jelena Damnjanovic, Del Mar, CA (US); Jing Sun, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/451,093

(22) Filed: Oct. 15, 2021

(65) Prior Publication Data

US 2022/0131575 A1 Apr. 28, 2022

Related U.S. Application Data

(60) Provisional application No. 63/112,110, filed on Nov. 10, 2020, provisional application No. 63/104,956, filed on Oct. 23, 2020.

(51) Int. Cl.
*H04B 7/06* (2006.01)
*H04B 7/0408* (2017.01)
*H04B 7/08* (2006.01)

(52) U.S. Cl.
CPC ........ *H04B 7/0408* (2013.01); *H04B 7/0626* (2013.01); *H04B 7/0695* (2013.01); *H04B 7/088* (2013.01)

(58) Field of Classification Search
CPC .. H04B 7/0408; H04B 7/0626; H04B 7/0695; H04B 7/088; H04B 7/0404; H04B 7/0691
See application file for complete search history.

(56) References Cited

U.S. PATENT DOCUMENTS

| | | | |
|---|---|---|---|
| 2021/0385039 A1* | 12/2021 | Cha | H04L 5/0048 |
| 2022/0022215 A1* | 1/2022 | Gao | H04B 7/0404 |
| 2022/0060302 A1* | 2/2022 | Zhang | H04W 72/08 |
| 2022/0173782 A1* | 6/2022 | Zhang | H04W 24/10 |
| 2022/0174719 A1* | 6/2022 | Zhang | H04W 72/1231 |

* cited by examiner

*Primary Examiner* — Kenneth T Lam
(74) *Attorney, Agent, or Firm* — QUALCOMM Incorporated

(57) ABSTRACT

Various aspects of the present disclosure generally relate to wireless communication. In some aspects, a user equipment (UE) may receive, from a base station, an indication of at least one first beam and at least one first antenna panel of the UE, to use for one or more first transmissions, and of at least one second beam and at least one second antenna panel of the UE, to use for one or more second transmissions. Accordingly, the UE may communicate the one or more first transmissions, with the base station, using the at least one first beam and the at least one first antenna panel. Additionally, the UE may communicate the one or more second transmissions, with the base station, using the at least one second beam and the at least one second antenna panel. Numerous other aspects are provided.

30 Claims, 11 Drawing Sheets

USING DIFFERENT ANTENNA PANELS ACROSS TRANSMISSIONS

CROSS-REFERENCE TO RELATED APPLICATIONS

This Patent Applications claims priority to U.S. Provisional Patent Application No. 63/104,956, filed on Oct. 23, 2020, entitled "USING DIFFERENT ANTENNA PANELS ACROSS TRANSMISSIONS," and assigned to the assignee hereof, and to U.S. Provisional Patent Application No. 63/112,110, filed on Nov. 10, 2020, entitled "USER EQUIPMENT PANEL ID RELATED SCHEDULING," and assigned to the assignee hereof. The disclosures of the prior Applications are considered part of and are incorporated by reference in this Patent Application.

FIELD OF THE DISCLOSURE

Aspects of the present disclosure generally relate to wireless communication and to techniques and apparatuses for using different antenna panels across transmissions.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving, from a base station, an indication of at least one first beam and at least one first antenna panel of the UE, to use for one or more first transmissions, and of at least one second beam and at least one second antenna panel of the UE, to use for one or more second transmissions. The method may further include communicating the one or more first transmissions, with the base station, using the at least one first beam and the at least one first antenna panel. The method may include communicating the one or more second transmissions, with the base station, using the at least one second beam and the at least one second antenna panel.

Some aspects described herein relate to a method of wireless communication performed by a base station. The method may include transmitting, to a UE, an indication of at least one first beam and at least one first antenna panel of the UE, to use for one or more first transmissions, and of at least one second beam and at least one second antenna panel of the UE, to use for one or more second transmissions. The method may further include communicating the one or more first transmissions, with the UE, using the at least one first beam and the at least one first antenna panel. The method may include communicating the one or more second transmissions, with the UE, using the at least one second beam and the at least one second antenna panel.

Some aspects described herein relate to an apparatus for wireless communication at a UE. The apparatus may include a memory and one or more processors coupled to the memory. The one or more processors may be configured to receive, from a base station, an indication of at least one first beam and at least one first antenna panel of the UE, to use for one or more first transmissions, and of at least one second beam and at least one second antenna panel of the UE, to use for one or more second transmissions. The one or more processors may be further configured to communicate the one or more first transmissions, with the base station, using the at least one first beam and the at least one first antenna panel. The one or more processors may be configured to communicate the one or more second transmissions, with the base station, using the at least one second beam and the at least one second antenna panel.

Some aspects described herein relate to an apparatus for wireless communication at a base station. The apparatus may include a memory and one or more processors coupled to the memory. The one or more processors may be configured to transmit, to a UE, an indication of at least one first beam and at least one first antenna panel of the UE, to use for one or more first transmissions, and of at least one second beam and at least one second antenna panel of the UE, to use for one or more second transmissions. The one or more processors may be configured to communicate the one or more first transmissions, with the UE, using the at least one first beam and the at least one first antenna panel. The one or more processors may be configured to communicate the one or more second transmissions, with the UE, using the at least one second beam and the at least one second antenna panel.

Some aspects described herein relate to a non-transitory computer-readable medium that stores a set of instructions for wireless communication by a UE. The set of instructions, when executed by one or more processors of the UE, may cause the UE to receive, from a base station, an indication of at least one first beam and at least one first antenna panel of the UE, to use for one or more first transmissions, and of at least one second beam and at least one second antenna panel of the UE, to use for one or more second transmissions. The set of instructions, when executed by one or more processors of the UE, may further cause the UE to communicate the one or more first transmissions, with the base station, using the at least one first beam and the at least one first antenna panel. The set of instructions, when executed by one or more processors of the UE, may cause the UE to communicate the one or more second transmissions, with the base station, using the at least one second beam and the at least one second antenna panel.

Some aspects described herein relate to a non-transitory computer-readable medium that stores a set of instructions for wireless communication by a base station. The set of instructions, when executed by one or more processors of the base station, may cause the base station to transmit, to a UE, an indication of at least one first beam and at least one first antenna panel of the UE, to use for one or more first transmissions, and of at least one second beam and at least one second antenna panel of the UE, to use for one or more second transmissions. The set of instructions, when executed by one or more processors of the base station, may further cause the base station to communicate the one or more first transmissions, with the UE, using the at least one first beam and the at least one first antenna panel. The set of instructions, when executed by one or more processors of the base station, may cause the base station to communicate the one or more second transmissions, with the UE, using the at least one second beam and the at least one second antenna panel.

Some aspects described herein relate to an apparatus for wireless communication. The apparatus may include means for receiving, from a base station, an indication of at least one first beam and at least one first antenna panel of the apparatus, to use for one or more first transmissions, and of at least one second beam and at least one second antenna panel of the apparatus, to use for one or more second transmissions. The apparatus may further include means for communicating the one or more first transmissions, with the base station, using the at least one first beam and the at least one first antenna panel. The apparatus may include means for communicating the one or more second transmissions, with the base station, using the at least one second beam and the at least one second antenna panel.

Some aspects described herein relate to an apparatus for wireless communication. The apparatus may include means for transmitting, to a UE, an indication of at least one first beam and at least one first antenna panel of the UE, to use for one or more first transmissions, and of at least one second beam and at least one second antenna panel of the UE, to use for one or more second transmissions. The apparatus may further include means for communicating the one or more first transmissions, with the UE, using the at least one first beam and the at least one first antenna panel. The apparatus may include means for communicating the one or more second transmissions, with the UE, using the at least one second beam and the at least one second antenna panel.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
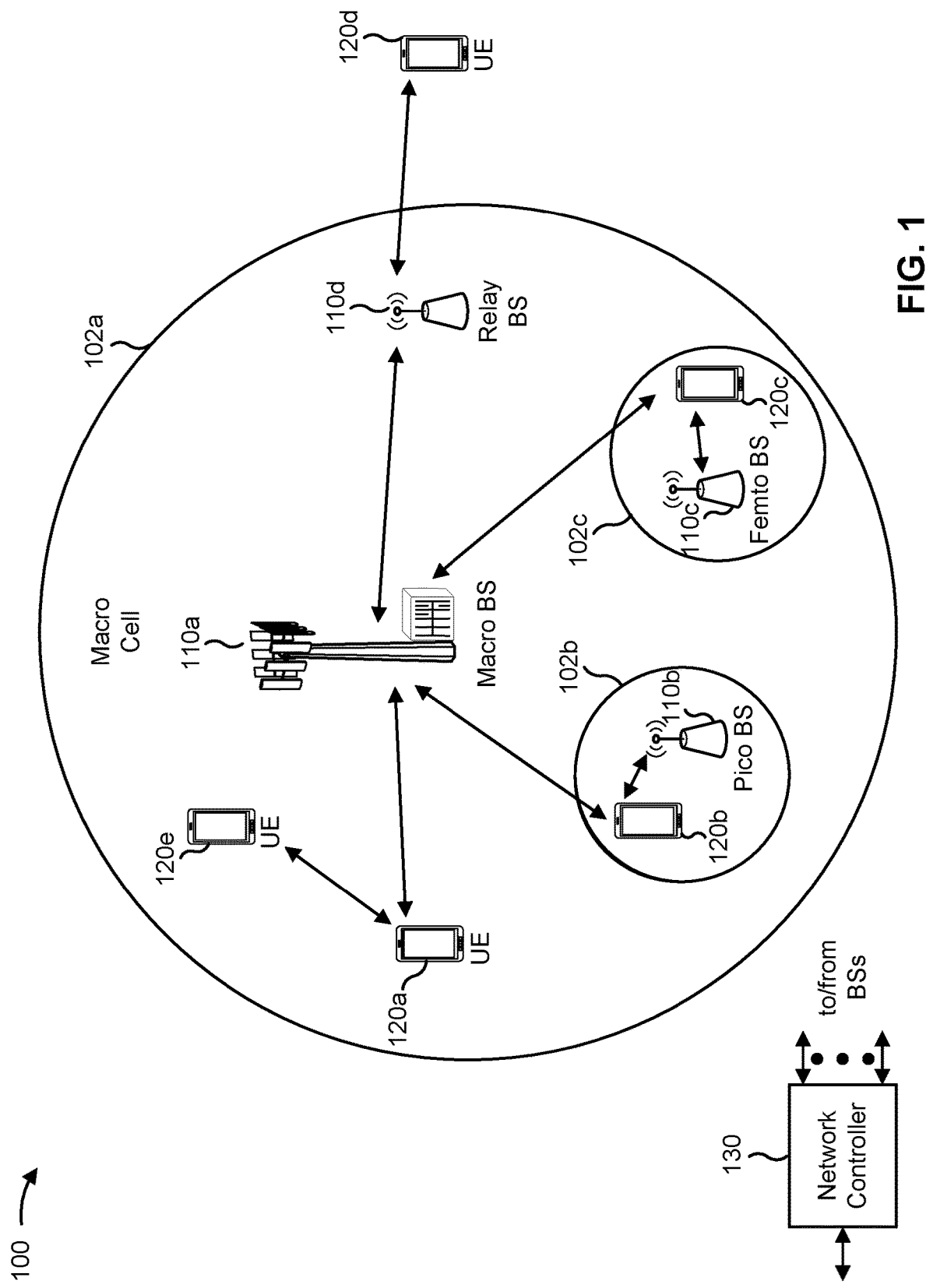
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As indicated above, FIG. 1 is provided as an example. Other examples may differ from what is described with regard to FIG. 1.

Figure 2:
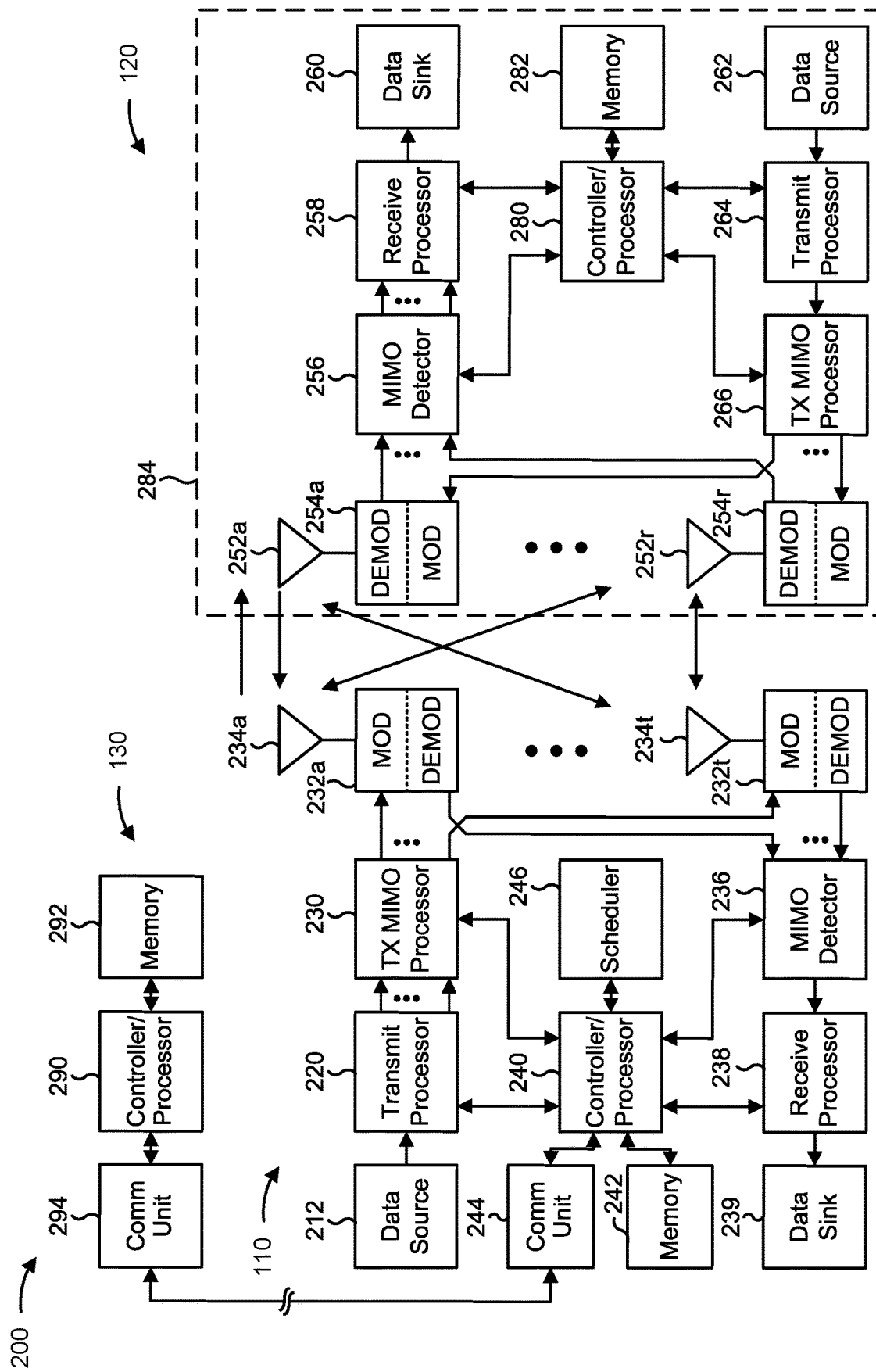
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-11).

The controller/processor 240 of the base station 110, the controller/processor 280 of the UE 120, and/or any other component(s) of FIG. 2 may perform one or more techniques associated with using different antenna panels across transmissions, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, a UE (e.g., UE 120 and/or apparatus 1000 of FIG. 10) may include means for receiving, from a base station (e.g., base station 110 and/or apparatus 1100 of FIG. 11), an indication of at least one first beam and at least one first antenna panel of the UE, to use for one or more first transmissions, and of at least one second beam and at least one second antenna panel of the UE, to use for one or more second transmissions; means for communicating the one or more first transmissions, with the base station, using the at least one first beam and the at least one first antenna panel; and/or means for communicating the one or more second transmissions, with the base station, using the at least one second beam and the at least one second antenna panel. The means for the UE to perform operations described herein may include, for example, one or more of antenna 252, modem 254, MIMO detector 256, receive processor 258, transmit processor 264, TX MIMO processor 266, controller/processor 280, or memory 282.

In some aspects, a base station (e.g., base station 110 and/or apparatus 1100 of FIG. 11) may include means for transmitting, to a UE (e.g., UE 120 and/or apparatus 1000 of FIG. 10), an indication of at least one first beam and at least one first antenna panel of the UE, to use for one or more first transmissions, and of at least one second beam and at least one second antenna panel of the UE, to use for one or more second transmissions; means for communicating the one or more first transmissions, with the UE, using the at least one first beam and the at least one first antenna panel; and/or means for communicating the one or more second transmissions, with the UE, using the at least one second beam and the at least one second antenna panel. The means for the base station to perform operations described herein may include, for example, one or more of transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
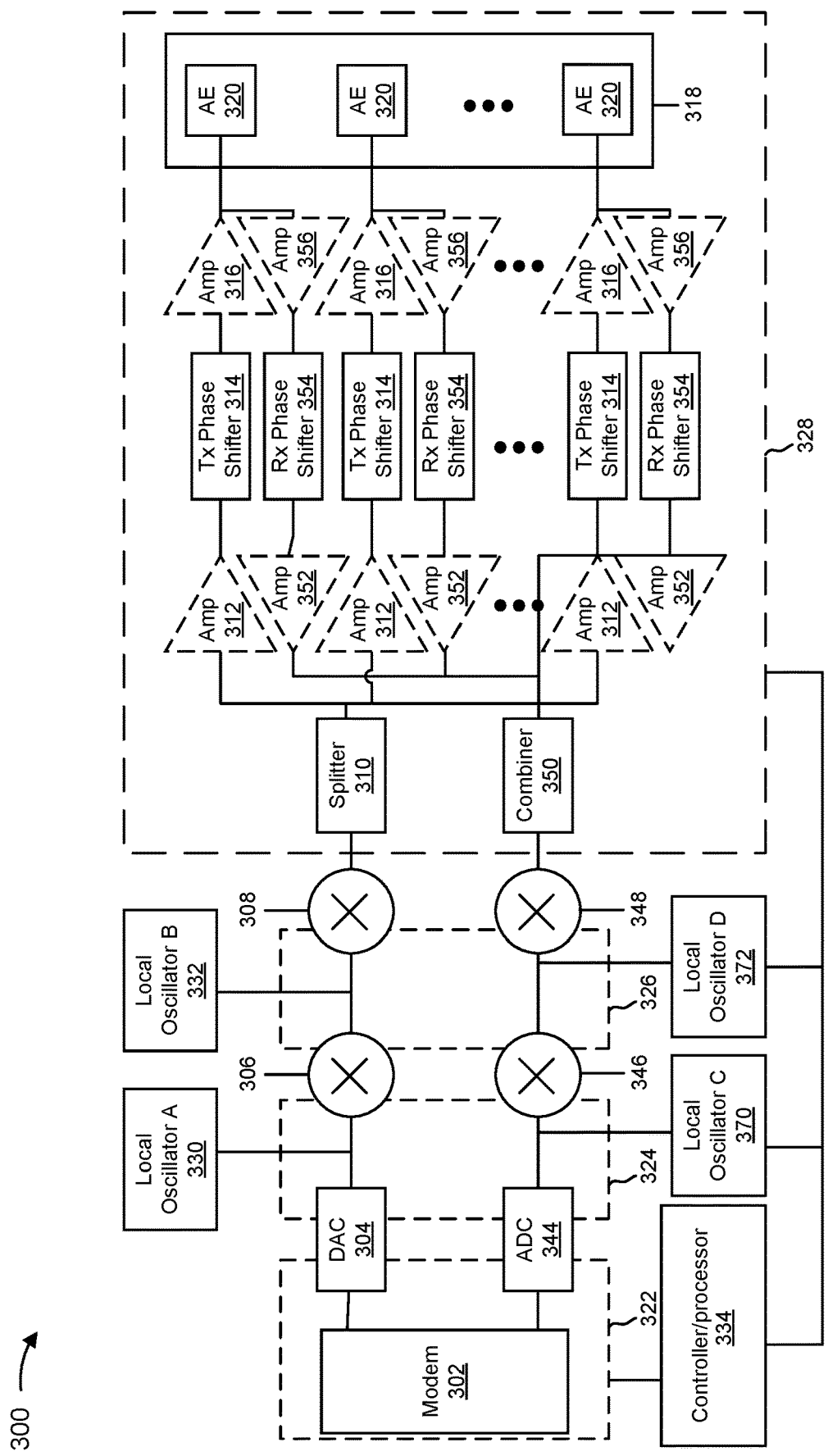
FIG. 3 is a diagram illustrating an example of beamforming architecture that supports beamforming for millimeter wave (mmW) communications, in accordance with the present disclosure.

FIG. 3 is a diagram illustrating an example beamforming architecture 300 that supports beamforming for mmW communications, in accordance with the present disclosure. In some aspects, architecture 300 may implement aspects of wireless network 100. In some aspects, architecture 300 may be implemented in a transmitting device (e.g., a first wireless communication device, UE, or base station) and/or a receiving device (e.g., a second wireless communication device, UE, or base station), as described herein.

Broadly, FIG. 3 is a diagram illustrating example hardware components of a wireless communication device in accordance with certain aspects of the disclosure. The illustrated components may include those that may be used for antenna element selection and/or for beamforming for transmission of wireless signals. There are numerous architectures for antenna element selection and implementing phase shifting, only one example of which is illustrated here. The architecture 300 includes a modem (modulator/demodulator) 302, a digital to analog converter (DAC) 304, a first mixer 306, a second mixer 308, and a splitter 310. The architecture 300 also includes multiple first amplifiers 312, multiple phase shifters 314, multiple second amplifiers 316, and an antenna array 318 that includes multiple antenna elements 320. In some examples, the modem 302 may be one or more of the modems 232 or modems 254 described in connection with FIG. 2.

Transmission lines or other waveguides, wires, and/or traces are shown connecting the various components to illustrate how signals to be transmitted may travel between components. Reference numbers 322, 324, 326, and 328 indicate regions in the architecture 300 in which different types of signals travel or are processed. Specifically, reference number 322 indicates a region in which digital baseband signals travel or are processed, reference number 324 indicates a region in which analog baseband signals travel or are processed, reference number 326 indicates a region in which analog intermediate frequency (IF) signals travel or are processed, and reference number 328 indicates a region in which analog radio frequency (RF) signals travel or are processed. The architecture also includes a local oscillator A 330, a local oscillator B 332, and a controller/processor 334. In some aspects, controller/processor 334 corresponds to controller/processor 240 of the base station described above in connection with FIG. 2 and/or controller/processor 280 of the UE described above in connection with FIG. 2.

Each of the antenna elements 320 may include one or more sub-elements for radiating or receiving RF signals. For example, a single antenna element 320 may include a first sub-element cross-polarized with a second sub-element that can be used to independently transmit cross-polarized signals. The antenna elements 320 may include patch antennas, dipole antennas, or other types of antennas arranged in a linear pattern, a two dimensional pattern, or another pattern. A spacing between antenna elements 320 may be such that signals with a desired wavelength transmitted separately by the antenna elements 320 may interact or interfere (e.g., to form a desired beam). For example, given an expected range of wavelengths or frequencies, the spacing may provide a quarter wavelength, half wavelength, or other fraction of a wavelength of spacing between neighboring antenna elements 320 to allow for interaction or interference of signals transmitted by the separate antenna elements 320 within that expected range.

The modem 302 processes and generates digital baseband signals and may also control operation of the DAC 304, first and second mixers 306 and 308, splitter 310, first amplifiers 312, phase shifters 314, and/or the second amplifiers 316 to transmit signals via one or more or all of the antenna elements 320. The modem 302 may process signals and control operation in accordance with a communication standard such as a wireless standard discussed herein. The DAC 304 may convert digital baseband signals received from the modem 302 (and that are to be transmitted) into analog baseband signals. The first mixer 306 upconverts analog baseband signals to analog IF signals within an IF using a local oscillator A 330. For example, the first mixer 306 may mix the signals with an oscillating signal generated by the local oscillator A 330 to "move" the baseband analog signals to the IF. In some cases, some processing or filtering (not shown) may take place at the IF. The second mixer 308 upconverts the analog IF signals to analog RF signals using the local oscillator B 332. Similar to the first mixer, the second mixer 308 may mix the signals with an oscillating signal generated by the local oscillator B 332 to "move" the IF analog signals to the RF or the frequency at which signals will be transmitted or received. The modem 302 and/or the controller/processor 334 may adjust the frequency of local oscillator A 330 and/or the local oscillator B 332 so that a desired IF and/or RF frequency is produced and used to facilitate processing and transmission of a signal within a desired bandwidth.

In the illustrated architecture 300, signals upconverted by the second mixer 308 are split or duplicated into multiple signals by the splitter 310. The splitter 310 in architecture 300 splits the RF signal into multiple identical or nearly identical RF signals. In other examples, the split may take place with any type of signal, including with baseband digital, baseband analog, or IF analog signals. Each of these signals may correspond to an antenna element 320, and the signal travels through and is processed by amplifiers 312 and 316, phase shifters 314, and/or other elements corresponding to the respective antenna element 320 to be provided to and transmitted by the corresponding antenna element 320 of the antenna array 318. In one example, the splitter 310 may be an active splitter that is connected to a power supply and provides some gain so that RF signals exiting the splitter 310 are at a power level equal to or greater than the signal entering the splitter 310. In another example, the splitter 310 is a passive splitter that is not connected to power supply and the RF signals exiting the splitter 310 may be at a power level lower than the RF signal entering the splitter 310.

After being split by the splitter 310, the resulting RF signals may enter an amplifier, such as a first amplifier 312, or a phase shifter 314 corresponding to an antenna element 320. The first and second amplifiers 312 and 316 are illustrated with dashed lines because one or both of them might not be necessary in some aspects. In some aspects, both the first amplifier 312 and second amplifier 316 are present. In some aspects, neither the first amplifier 312 nor the second amplifier 316 is present. In some aspects, one of the two amplifiers 312 and 316 is present but not the other. By way of example, if the splitter 310 is an active splitter, the first amplifier 312 may not be used. By way of further example, if the phase shifter 314 is an active phase shifter that can provide a gain, the second amplifier 316 might not be used.

The amplifiers 312 and 316 may provide a desired level of positive or negative gain. A positive gain (positive dB) may be used to increase an amplitude of a signal for radiation by a specific antenna element 320. A negative gain (negative dB) may be used to decrease an amplitude and/or suppress radiation of the signal by a specific antenna element. Each of the amplifiers 312 and 316 may be controlled independently (e.g., by the modem 302 or the controller/processor 334) to provide independent control of the gain for each antenna element 320. For example, the modem 302 and/or the controller/processor 334 may have at least one control line connected to each of the splitter 310, first amplifiers 312, phase shifters 314, and/or second amplifiers 316 that may be used to configure a gain to provide a desired amount of gain for each component and thus each antenna element 320.

The phase shifter 314 may provide a configurable phase shift or phase offset to a corresponding RF signal to be transmitted. The phase shifter 314 may be a passive phase shifter not directly connected to a power supply. Passive phase shifters might introduce some insertion loss. The second amplifier 316 may boost the signal to compensate for the insertion loss. The phase shifter 314 may be an active phase shifter connected to a power supply such that the active phase shifter provides some amount of gain or prevents insertion loss. The settings of each of the phase shifters 314 are independent, meaning that each can be independently set to provide a desired amount of phase shift or the same amount of phase shift or some other configuration. The modem 302 and/or the controller/processor 334 may have at least one control line connected to each of the phase shifters 314 and which may be used to configure the phase shifters 314 to provide a desired amount of phase shift or phase offset between antenna elements 320.

In the illustrated architecture 300, RF signals received by the antenna elements 320 are provided to one or more first amplifiers 356 to boost the signal strength. The first amplifiers 356 may be connected to the same antenna arrays 318 (e.g., for time division duplex (TDD) operations). The first amplifiers 356 may be connected to different antenna arrays 318. The boosted RF signal is input into one or more phase shifters 354 to provide a configurable phase shift or phase offset for the corresponding received RF signal to enable reception via one or more Rx beams. The phase shifter 354 may be an active phase shifter or a passive phase shifter. The settings of the phase shifters 354 are independent, meaning that each can be independently set to provide a desired amount of phase shift or the same amount of phase shift or some other configuration. The modem 302 and/or the controller/processor 334 may have at least one control line connected to each of the phase shifters 354 and which may be used to configure the phase shifters 354 to provide a desired amount of phase shift or phase offset between antenna elements 320 to enable reception via one or more Rx beams.

The outputs of the phase shifters 354 may be input to one or more second amplifiers 352 for signal amplification of the phase shifted received RF signals. The second amplifiers 352 may be individually configured to provide a configured amount of gain. The second amplifiers 352 may be individually configured to provide an amount of gain to ensure that the signals input to combiner 350 have the same magnitude. The amplifiers 352 and/or 356 are illustrated in dashed lines because they might not be necessary in some aspects. In some aspects, both the amplifier 352 and the amplifier 356 are present. In another aspect, neither the amplifier 352 nor the amplifier 356 are present. In other aspects, one of the amplifiers 352 and 356 is present but not the other.

In the illustrated architecture 300, signals output by the phase shifters 354 (via the amplifiers 352 when present) are combined in combiner 350. The combiner 350 in architecture 300 combines the RF signal into a signal. The combiner 350 may be a passive combiner (e.g., not connected to a power source), which may result in some insertion loss. The combiner 350 may be an active combiner (e.g., connected to a power source), which may result in some signal gain. When combiner 350 is an active combiner, it may provide a different (e.g., configurable) amount of gain for each input signal so that the input signals have the same magnitude when they are combined. When combiner 350 is an active combiner, the combiner 350 may not need the second amplifier 352 because the active combiner may provide the signal amplification.

The output of the combiner 350 is input into mixers 348 and 346. Mixers 348 and 346 generally down convert the received RF signal using inputs from local oscillators 372 and 370, respectively, to create intermediate or baseband signals that carry the encoded and modulated information. The output of the mixers 348 and 346 are input into an analog-to-digital converter (ADC) 344 for conversion to analog signals. The analog signals output from ADC 344 is input to modem 302 for baseband processing, such as decoding, de-interleaving, or similar operations.

The architecture 300 is given by way of example only to illustrate an architecture for transmitting and/or receiving signals. In some cases, the architecture 300 and/or each portion of the architecture 300 may be repeated multiple times within an architecture to accommodate or provide an arbitrary number of RF chains, antenna elements, and/or antenna panels. Furthermore, numerous alternate architectures are possible and contemplated. For example, although only a single antenna array 318 is shown, two, three, or more antenna arrays may be included, each with one or more of their own corresponding amplifiers, phase shifters, splitters, mixers, DACs, ADCs, and/or modems. For example, a single UE may include two, four, or more antenna arrays for transmitting or receiving signals at different physical locations on the UE or in different directions.

Furthermore, mixers, splitters, amplifiers, phase shifters and other components may be located in different signal type areas (e.g., represented by different ones of the reference numbers 322, 324, 326, and 328) in different implemented architectures. For example, a split of the signal to be transmitted into multiple signals may take place at the analog RF, analog IF, analog baseband, or digital baseband frequencies in different examples. Similarly, amplification and/or phase shifts may also take place at different frequencies. For example, in some aspects, one or more of the splitter 310, amplifiers 312 and 316, or phase shifters 314 may be located between the DAC 304 and the first mixer 306 or between the first mixer 306 and the second mixer 308. In one example, the functions of one or more of the components may be combined into one component. For example, the phase shifters 314 may perform amplification to include or replace the first amplifiers 312 and/or the second amplifiers 316. By way of another example, a phase shift may be implemented by the second mixer 308 to obviate the need for a separate phase shifter 314. This technique is sometimes called local oscillator (LO) phase shifting. In some aspects of this configuration, there may be multiple IF to RF mixers (e.g., for each antenna element chain) within the second mixer 308, and the local oscillator B 332 may supply different local oscillator signals (with different phase offsets) to each IF to RF mixer.

The modem 302 and/or the controller/processor 334 may control one or more of the other components 304 through 372 to select one or more antenna elements 320 and/or to form beams for transmission of one or more signals. For example, the antenna elements 320 may be individually selected or deselected for transmission of a signal (or signals) by controlling an amplitude of one or more corresponding amplifiers, such as the first amplifiers 312 and/or the second amplifiers 316. Beamforming includes generation of a beam using multiple signals on different antenna elements, where one or more or all of the multiple signals are shifted in phase relative to each other. The formed beam may carry physical or higher layer reference signals or information. As each signal of the multiple signals is radiated from a respective antenna element 320, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 318) can be dynamically controlled by modifying the phase shifts or phase offsets imparted by the phase shifters 314 and amplitudes imparted by the amplifiers 312 and 316 of the multiple signals relative to each other. The controller/processor 334 may be located partially or fully within one or more other components of the architecture 300. For example, the controller/processor 334 may be located within the modem 302 in some aspects.

As indicated above, FIG. 3 is provided as an example. Other examples may differ from what is described with regard to FIG. 3.

Figure 4:
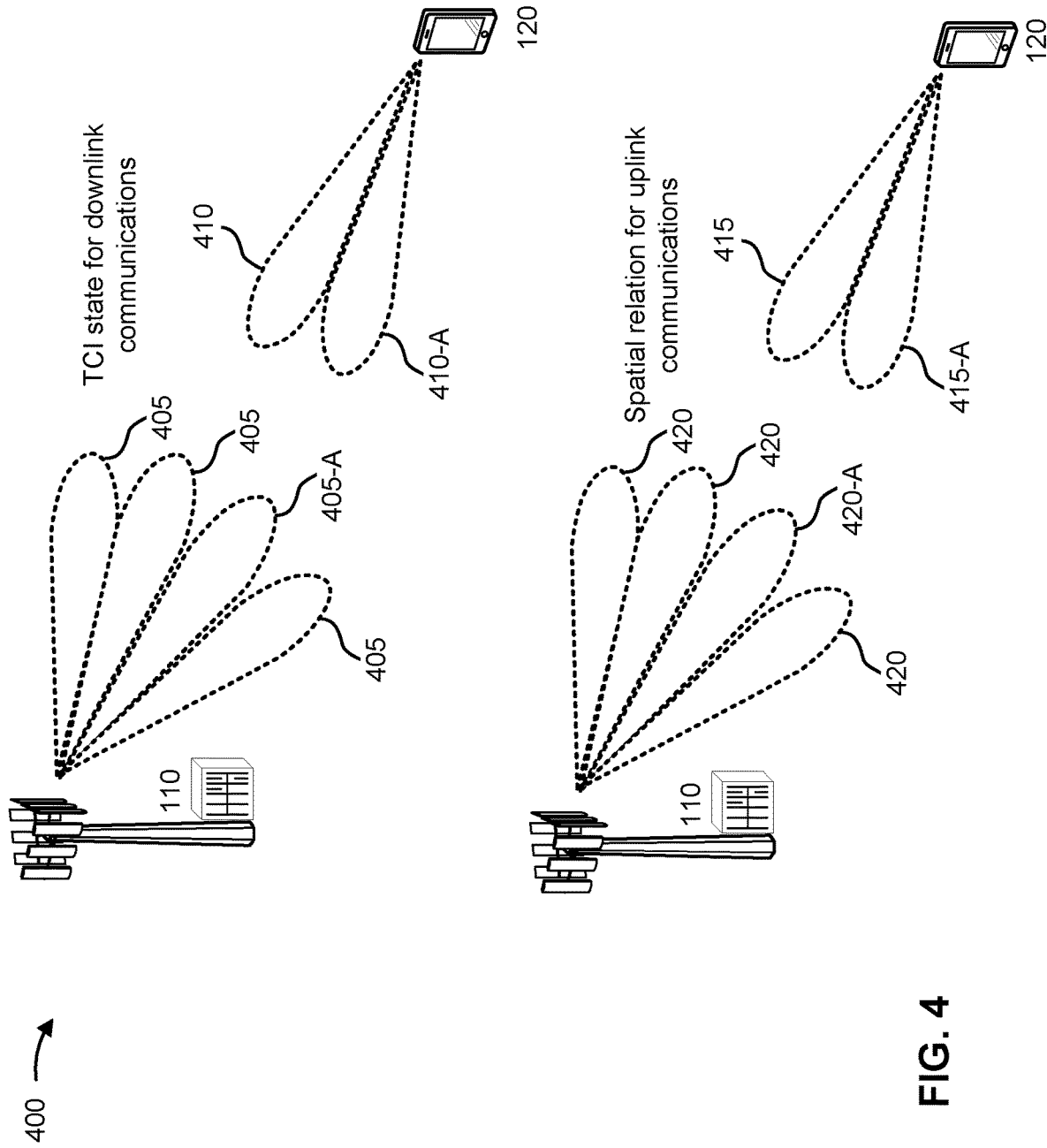
FIG. 4 is a diagram illustrating an example of using beams for communications between a base station and a UE, in accordance with the present disclosure.

FIG. 4 is a diagram illustrating an example 400 of using beams for communications between a base station and a UE, in accordance with the present disclosure. As shown in FIG. 4, a base station 110 and a UE 120 may communicate with one another.

The base station 110 may transmit to UEs 120 located within a coverage area of the base station 110. The base station 110 and the UE 120 may be configured for beamformed communications, where the base station 110 may transmit in the direction of the UE 120 using a directional BS transmit beam, and the UE 120 may receive the transmission using a directional UE receive beam. Each BS transmit beam may have an associated beam ID, beam direction, or beam symbols, among other examples. The base station 110 may transmit downlink communications via one or more BS transmit beams 405.

The UE 120 may attempt to receive downlink transmissions via one or more UE receive beams 410, which may be configured using different beamforming parameters at receive circuitry of the UE 120. The UE 120 may identify a particular BS transmit beam 405, shown as BS transmit beam 405-A, and a particular UE receive beam 410, shown as UE receive beam 410-A, that provide relatively favorable performance (for example, that have a best channel quality of the different measured combinations of BS transmit beams 405 and UE receive beams 410). In some examples, the UE 120 may transmit an indication of which BS transmit beam 405 is identified by the UE 120 as a preferred BS transmit beam, which the base station 110 may select for transmissions to the UE 120. The UE 120 may thus attain and maintain a beam pair link (BPL) with the base station 110 for downlink communications (for example, a combination of the BS transmit beam 405-A and the UE receive beam 410-A), which may be further refined and maintained in accordance with one or more established beam refinement procedures.

A downlink beam, such as a BS transmit beam 405 or a UE receive beam 410, may be associated with a transmission configuration indication (TCI) state. A TCI state may indicate a directionality or a characteristic of the downlink beam, such as one or more quasi-co-location (QCL) properties of the downlink beam. A QCL property may include, for example, a Doppler shift, a Doppler spread, an average delay, a delay spread, or spatial receive parameters, among other examples. In some examples, each BS transmit beam 405 may be associated with a synchronization signal block (SSB), and the UE 120 may indicate a preferred BS transmit beam 405 by transmitting uplink transmissions in resources of the SSB that are associated with the preferred BS transmit beam 405. A particular SSB may have an associated TCI state (for example, for an antenna port or for beamforming). The base station 110 may, in some examples, indicate a downlink BS transmit beam 405 based at least in part on antenna port QCL properties that may be indicated by the TCI state. A TCI state may be associated with one downlink reference signal set (for example, an SSB and an aperiodic, periodic, or semi-persistent channel state information reference signal (CSI-RS)) for different QCL types (for example, QCL types for different combinations of Doppler shift, Doppler spread, average delay, delay spread, or spatial receive parameters, among other examples). In cases where the QCL type indicates spatial receive parameters, the QCL type may correspond to analog receive beamforming parameters of a UE receive beam 410 at the UE 120. Thus, the UE 120 may select a corresponding UE receive beam 410 from a set of BPLs based at least in part on the base station 110 indicating a BS transmit beam 405 via a TCI indication.

The base station 110 may maintain a set of activated TCI states for downlink shared channel transmissions and a set of activated TCI states for downlink control channel transmissions. The set of activated TCI states for downlink shared channel transmissions may correspond to beams that the base station 110 uses for downlink transmission on a physical downlink shared channel (PDSCH). The set of activated TCI states for downlink control channel communications may correspond to beams that the base station 110 may use for downlink transmission on a physical downlink control channel (PDCCH) or in a control resource set (CORESET). The UE 120 may also maintain a set of activated TCI states for receiving the downlink shared channel transmissions and the CORESET transmissions. If a TCI state is activated for the UE 120, then the UE 120 may have one or more antenna configurations based at least in part on the TCI state, and the UE 120 may not need to reconfigure antennas or antenna weighting configurations. In some examples, the set of activated TCI states (for example, activated PDSCH TCI states and activated CORESET TCI states) for the UE 120 may be configured by a configuration message, such as a radio resource control (RRC) message.

Similarly, for uplink communications, the UE 120 may transmit in the direction of the base station 110 using a directional UE transmit beam, and the base station 110 may receive the transmission using a directional BS receive beam. Each UE transmit beam may have an associated beam ID, beam direction, or beam symbols, among other examples. The UE 120 may transmit uplink communications via one or more UE transmit beams 415.

The base station 110 may receive uplink transmissions via one or more BS receive beams 420. The base station 110 may identify a particular UE transmit beam 415, shown as UE transmit beam 415-A, and a particular BS receive beam 420, shown as BS receive beam 420-A, that provide relatively favorable performance (for example, that have a best channel quality of the different measured combinations of UE transmit beams 415 and BS receive beams 420). In some examples, the base station 110 may transmit an indication of which UE transmit beam 415 is identified by the base station 110 as a preferred UE transmit beam, which the base station 110 may select for transmissions from the UE 120. The UE 120 and the base station 110 may thus attain and maintain a BPL for uplink communications (for example, a combination of the UE transmit beam 415-A and the BS receive beam 420-A), which may be further refined and maintained in accordance with one or more established beam refinement procedures. An uplink beam, such as a UE transmit beam 415 or a BS receive beam 420, may be associated with a spatial relation. A spatial relation may indicate a directionality or a characteristic of the uplink beam, similar to one or more QCL properties, as described above.

As indicated above, FIG. 4 is provided as an example. Other examples may differ from what is described with respect to FIG. 4.

Figure 5:
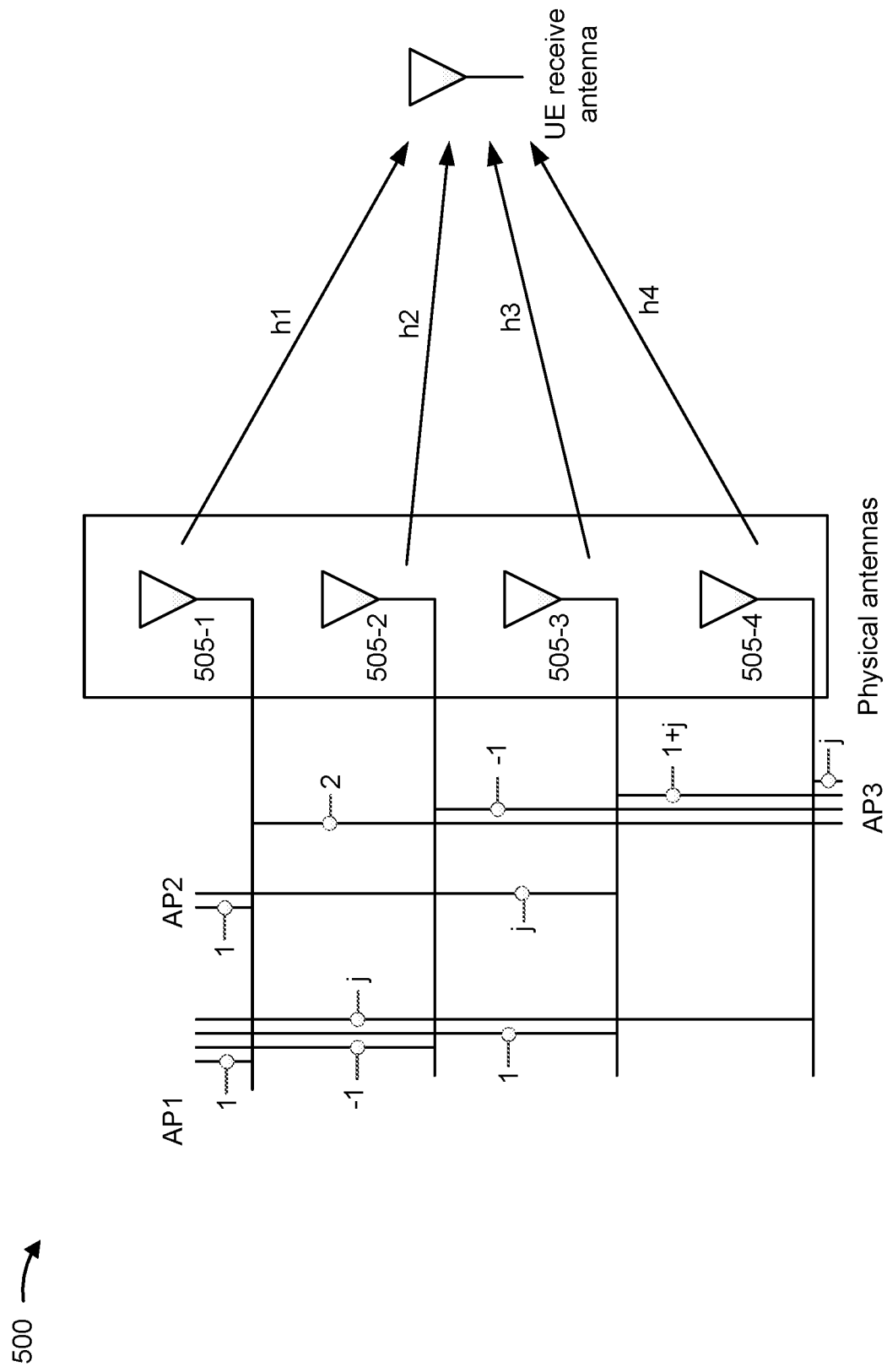
FIG. 5 is a diagram illustrating an example of antenna ports, in accordance with the present disclosure.

FIG. 5 is a diagram illustrating an example 500 of antenna ports, in accordance with the present disclosure. As shown in FIG. 5, a first physical antenna 505-1 may transmit information via a first channel h1, a second physical antenna 505-2 may transmit information via a second channel h2, a third physical antenna 505-3 may transmit information via a third channel h3, and a fourth physical antenna 505-4 may transmit information via a fourth channel h4. Such information may be conveyed via a logical antenna port, which may represent some combination of the physical antennas and/or channels. In some cases, a UE 120 may not have knowledge of the channels associated with the physical antennas, and may only operate based on knowledge of the channels associated with antenna ports, as defined below.

An antenna port may be defined such that a channel, over which a symbol on the antenna port is conveyed, can be inferred from a channel over which another symbol on the same antenna port is conveyed. In example 500, a channel associated with antenna port 1 (AP1) is represented as h1−h2+h3+j*h4, where channel coefficients (e.g., 1, −1, 1, and j, in this case) represent weighting factors (e.g., indicating phase and/or gain) applied to each channel. Such weighting factors may be applied to the channels to improve signal power and/or signal quality at one or more receivers. Applying such weighting factors to channel transmissions may be referred to as precoding, and a precoder may refer to a specific set of weighting factors applied to a set of channels.

Similarly, a channel associated with antenna port 2 (AP2) is represented as h1+j*h3, and a channel associated with antenna port 3 (AP3) is represented as 2*h1−h2+(1+j)*h3+j*h4. In this case, antenna port 3 can be represented as the sum of antenna port 1 and antenna port 2 (e.g., AP3=AP1+AP2) because the sum of the expression representing antenna port 1 (h1−h2+h3+j*h4) and the expression representing antenna port 2 (h1+j*h3) equals the expression representing antenna port 3 (2*h1−h2+(1+j)*h3+j*h4). It can also be said that antenna port 3 is related to antenna ports 1 and 2 [AP1,AP2] via the precoder [1,1] because 1 times the expression representing antenna port 1 plus 1 times the expression representing antenna port 2 equals the expression representing antenna port 3.

As indicated above, FIG. 5 is provided merely as an example. Other examples may differ from what is described with regard to FIG. 5.

In some situations, a UE may include multiple antenna panels, where each panel includes a plurality of antenna elements. Each antenna panel may be identified using a corresponding panel identifier (ID) and/or another ID (e.g., a beam group ID, an antenna port group ID). For example, the UE may include three panels, where each panel has N antenna elements (e.g., cross-polarized elements and/or other similar antenna elements). An antenna panel may include a physical grouping of antenna elements (e.g., the elements are embedded in a same substrate and/or sharing one or more hardware components, such as a modulator, a demodulator, and/or a processor) and/or a virtual grouping of antenna elements (e.g., the elements are grouped by the UE based at least in part on one or more properties of the elements). In some situations, the UE may assign antenna ports (e.g., as described in connection with FIG. 5) across antenna panels such that antenna ports that cannot simultaneously transmit and/or simultaneously receive are included on a same panel.

Generally, the base station associates each antenna panel of the UE with a different corresponding beam group and/or TCI state group. Accordingly, the base station may have to use suboptimal beams and/or TCI states for some antenna panels. For example, the base station may repeat transmissions across different antenna panels to increase reliability but may have to change beams and/or TCI states such that quality of at least some of the repetitions is decreased.

Some techniques and apparatuses described herein allow a base station (e.g., base station 110) to configure transmissions for a pair that includes a particular antenna panel of a UE (e.g., UE 120) and a particular beam and/or TCI state associated with the base station 110. For example, the base station 110 may indicate that a first antenna panel of the UE 120 should receive first transmissions using a first UE Rx beam and/or TCI state associated with a base station Tx beam and/or TCI state, and that a second antenna panel of the UE 120 should receive second transmissions using a second UE Rx beam and/or TCI state associated with the same base station Tx beam and/or TCI state. Accordingly, the base station 110 may use the same Tx beam and/or TCI state for repetition to different antenna panels in order to increase both reliability and quality of communications. In another example, the base station may indicate that a first antenna panel and a third antenna panel of the UE 120 should receive simultaneous first transmissions using a first UE Rx beam and/or TCI state associated with a first base station Tx beam and/or TCI state and a second UE Rx beam and/or TCI state associated with a second base station Tx beam and/or TCI state, and that a second antenna panel and a fourth antenna panel of the UE 120 should receive simultaneous second transmissions using a third UE Rx beam and/or TCI state associated with the same first base station Tx beam and/or TCI state and a fourth UE Rx beam and/or TCI state associated with the same second base station Tx beam and/or TCI state. Accordingly, the base station 110 may use the same beam and/or TCI state for repetition to different antenna panels during simultaneous transmission in order to increase both reliability and quality of communications.

Figure 6:
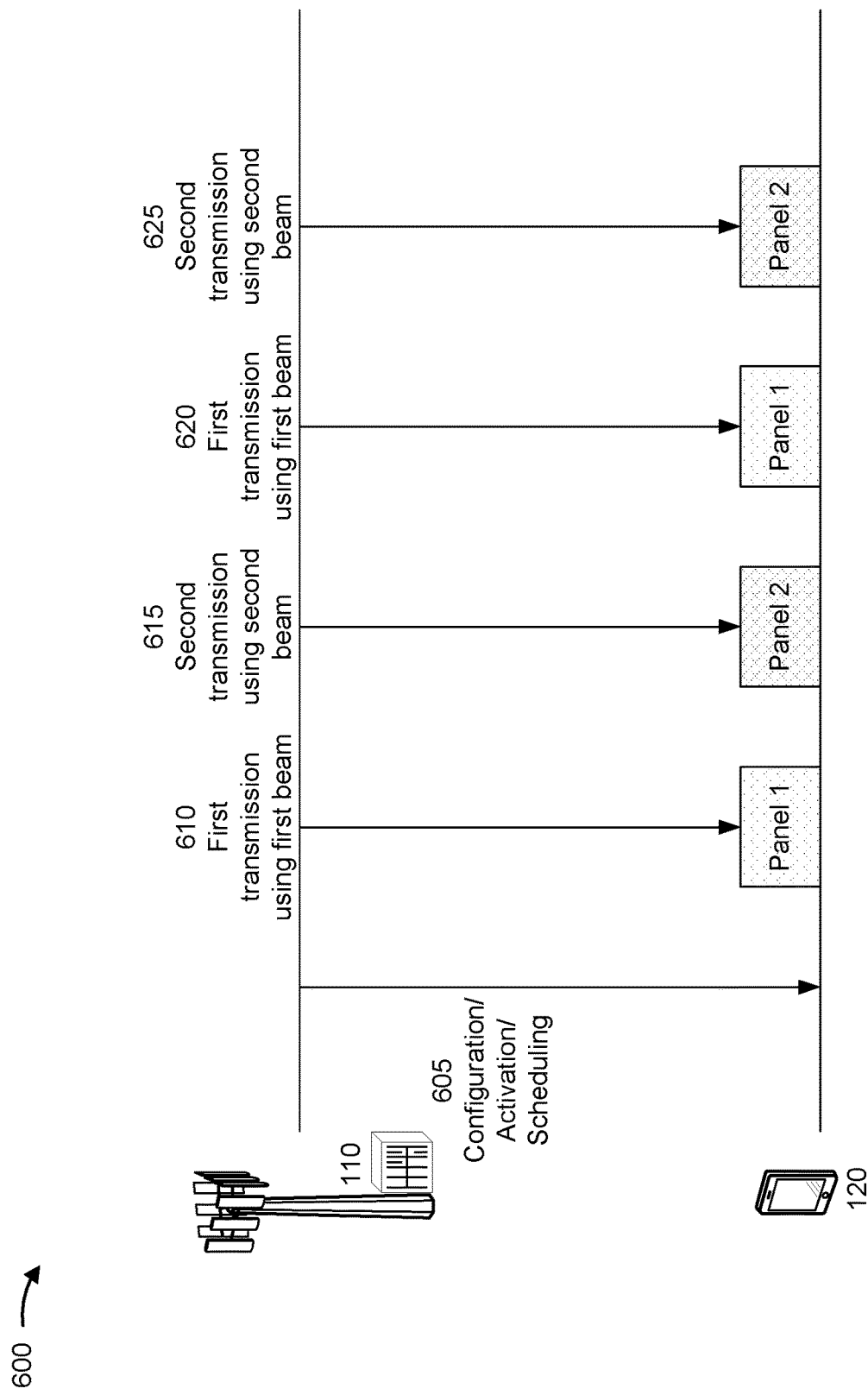
FIGS. 6 and 7 are diagrams illustrating examples associated with using different antenna panels across transmissions, in accordance with the present disclosure.

FIG. 6 is a diagram illustrating an example 600 associated with transmitting and receiving downlink reference signal reports for antenna panels, in accordance with the present disclosure. As shown in FIG. 6, example 600 includes communication between a base station 110 and a UE 120. In some aspects, the base station 110 and the UE 120 may be included in a wireless network, such as wireless network 100. The base station 110 and the UE 120 may communicate via a wireless access link, which may include an uplink and a downlink.

In some aspects, the UE 120 may include a plurality of antenna panels. In example 600, the UE 120 has two antenna panels, but other examples may include additional antenna panels (e.g., three panels, four panels, five panels, and so on). Each panel may include one or more antenna elements (e.g., cross-polarized elements and/or other similar antenna elements). In some aspects, an antenna panel may include a physical grouping of antenna elements (e.g., the elements are embedded in a same substrate and/or share one or more hardware components, such as a modulator, a demodulator, and/or a processor) and/or a virtual grouping of antenna elements (e.g., the elements are grouped by the UE 120 based at least in part on one or more properties of the elements). In some aspects, the UE 120 may assign antenna ports (e.g., as described in connection with FIG. 5) across antenna panels. For example, the UE 120 may assign one or more antenna port groups (e.g., where each group includes one or more antenna ports) across antenna panels (e.g., such that antenna port groups that cannot simultaneously transmit and/or simultaneously receive are included on a same antenna panel). Additionally, or alternatively, the UE 120 may assign antenna ports (e.g., as described above in connection with FIG. 5) across antenna panels such that each antenna panel is associated with a group of beams (e.g., where each group includes one or more beams formed, for example, as described in connection with FIG. 3) that can be formed by the antenna ports included in that antenna panel.

As shown in connection with reference number 605, the base station 110 may transmit, and the UE 120 may receive, an RRC message to configure one or more first transmissions and one or more second transmissions, a control element (e.g., a medium access control (MAC) control element (MAC-CE) and/or another control element) message to activate one or more first transmissions and one or more second transmissions, and/or a downlink control information (DCI) message to activate or schedule one or more first transmissions and one or more second transmissions. For example, the base station 110 may configure reference signal transmissions using the RRC message. In another example, the base station 110 may configure control channel messages using the control element message. In yet another example, the base station 110 may configure data transmissions using the DCI message.

In some aspects, the base station 110 may further transmit an indication of at least one first base station beam (e.g., formed using the hardware as described in connection with FIG. 3) and at least one first antenna panel of the UE 120, to use for the one or more first transmissions, and of the same at least one first base station beam or at least one second base station beam (e.g., formed using the hardware as described in connection with FIG. 3) and at least one second antenna panel of the UE 120, to use for the one or more second transmissions. Although the description herein focuses on the at least one first beam and the at least one second beam, the description similarly applies to TCI states (e.g., as described in connection with FIG. 4). For example, the base station 110 may additionally, or alternatively, associate the at least one first antenna panel of the UE 120 with at least one first TCI state to use for the one or more first transmissions, and associate the at least one second antenna panel of the UE 120 with the same at least one first TCI state or at least one second TCI state to use for the one or more second transmissions.

In some aspects, the indication of the at least one first antenna panel, of the UE 120, may include one or more panel identifiers associated with the at least one first antenna panel (e.g., one or more alphanumeric, hexadecimal, binary, numeric, and/or string-based identifiers assigned to the at least one first antenna panel by the UE 120 and/or the base station 110) and/or one or more other identifiers, such as one or more beam group identifiers associated with the at least one first antenna panel (e.g., one or more alphanumeric, hexadecimal, binary, numeric, and/or string-based identifiers assigned to one or more beam groups by the UE 120 and/or the base station 110, where the at least one first antenna panel is configured to transmit using the one or more beams included in those one or more beam groups associated with the at least one first antenna panel, as described above) and/or one or more antenna port group identifiers associated with the at least one first antenna panel (e.g., one or more alphanumeric, hexadecimal, binary, numeric, and/or string-based identifier assigned to one or more antenna port groups by the UE 120 and/or the base station 110, where the at least one first antenna panel includes the one or more antenna ports included in those one or more antenna port groups associated with the at least one first antenna panel, as described above). Additionally, or alternatively, the indication of the at least one second antenna panel, of the UE 120, may similarly include one or more panel identifiers associated with the at least one second antenna panel, one or more beam group identifiers associated with the at least one second antenna panel, or one or more antenna port group identifiers associated with the at least one second antenna panel, as described above.

In some aspects, the indication may include an index associated with a pattern that includes the at least one first beam associated with the at least one first antenna panel of the UE 120 and the at least one second beam associated with the at least one second antenna panel of the UE 120. For example, the index may map to a table (and/or other relational or graphical data structure) that includes the pattern associating the at least one first beam with the at least one first antenna panel of the UE 120 and the at least one second beam with the at least one second antenna panel of the UE 120. In some aspects, the index may map to a table programmed (and/or otherwise preconfigured) into the UE 120 and/or the base station 110. For example, the table may be defined in 3GPP specifications and/or another standard. Additionally, or alternatively, the index may map to a table indicated to the UE 120 by the base station 110. For example, the base station 110 may use RRC signaling to transmit or otherwise indicate the table to the UE 120.

In some aspects, the base station 110 may generate the indication based at least in part on information provided by the UE 120. For example, the UE 120 may transmit, and the base station 110 may receive, antenna panel related information (e.g., in a capability message or another type of message). The antenna panel related information may include one or more properties/capabilities (e.g., hardware and/or software properties/capabilities) associated with each antenna panel of the UE 120. For example, the antenna panel related information may include an operating frequency, a beam size (e.g., a maximum/minimum width and/or a maximum/minimum angle), a return loss, a gain, a processing speed, and/or a transmission type (e.g., uplink and/or downlink) associated with an antenna panel. Additionally, or alternatively, the antenna panel related information may include a recommendation or suggestion from the UE 120 to group the at least one first antenna panel with the at least one second antenna panel. For example, the UE 120 may indicate or suggest to group the at least one first antenna panel with the at least one second antenna panel because the panels have similar properties, capabilities, processing speeds, and/or transmission types, among other examples.

In example 600, the at least one first beam and the at least one second beam are associated with the base station and are the same base station beam, and the at least one first antenna panel of the UE 120 and the at least one second antenna panel of the UE 120 are different panels. Accordingly, when the one or more first transmissions and the one or more second transmissions are downlink transmissions, the base station 110 may use the same beam to transmit while the UE 120 may use different beams that may be associated with different antenna panels to receive (e.g., by applying different reception filters based at least in part on the different beams). Similarly, when the one or more first transmissions and the one or more second transmissions are uplink transmissions, the base station 110 may use the same beam to receive (e.g., by applying the same reception filter based at least in part on the same beam) while the UE 120 may use different beams that may be associated with different antenna panels to transmit.

As shown in connection with reference number 610, the UE 120 and the base station 110 may communicate the one or more first transmissions using the at least one first beam and the at least one first antenna panel. In some aspects, the one or more first transmissions may include one or more downlink transmissions. For example, the one or more first transmissions may include PDCCH transmissions, PDSCH transmissions, CSI-RS transmissions, or a combination thereof. Accordingly, in some aspects, the at least one first beam may be a downlink beam or a joint uplink-downlink beam.

As an alternative, the one or more first transmissions may include one or more uplink transmissions. For example, the one or more first transmissions may include physical uplink control channel (PUCCH) transmissions, physical uplink shared channel (PUSCH) transmissions, sounding reference signal (SRS) transmissions, physical random access channel (PRACH) transmissions, or a combination thereof. Accordingly, in some aspects, the at least one first beam may be an uplink beam, a joint uplink-downlink beam, or spatial relation information.

As shown in connection with reference number 615, the UE 120 and the base station 110 may communicate the one or more second transmissions using the at least one second beam and the at least one second antenna panel. In some aspects, the one or more second transmissions may include one or more downlink transmissions. For example, the one or more second transmissions may include PDCCH transmissions, PDSCH transmissions, CSI-RS transmissions, or a combination thereof. Accordingly, in some aspects, the at least one second beam may be a downlink beam or a joint uplink-downlink beam.

As an alternative, the one or more second transmissions may include one or more uplink transmissions. For example, the one or more second transmissions may include PUCCH transmissions, PUSCH transmissions, SRS transmissions, PRACH transmissions, or a combination thereof. Accordingly, in some aspects, the at least one second beam may be an uplink beam, a joint uplink-downlink beam, or spatial relation information.

The one or more first transmissions and the one or more second transmissions may be multiplexed in space, frequency, time, or a combination thereof. In example 600, the one or more first transmissions and the one or more second transmissions are multiplexed in time. In other examples, the one or more first transmissions and the one or more second transmissions may additionally or alternatively be multiplexed in space (e.g., associated with different beams) and/or frequency (e.g., at least partially orthogonal in frequency).

In some aspects, the base station 110 may associate (e.g., using the indication and/or another message to the UE 120) a multiplexing method for each antenna group (e.g., the at least one first antenna panel and the at least one second antenna panel). The multiplexing method may include frequency division multiplexing (FDM), time division multiplexing (TDM), space division multiplexing (SDM), or any combination thereof. Accordingly, the first transmission(s) and the second transmission(s) between the UE 120 and the base station 110 (or TRPs of the base station 110) may be based on SDM, TDM, FDM, or any combination thereof across different antenna panels (e.g., the first antenna panel(s) and the second antenna panel(s)). Accordingly, the panel SDM/TDM/FDM pattern may be configured by the base station 110 per panel group to use for scheduling such that the panel SDM/TDM/FDM pattern may be used for scheduling transmissions, such as the first transmission(s) and/or the second transmission(s).

In some aspects, the base station 110 may indicate a panel switch pattern for antenna panels within each panel group (e.g., the at least one first antenna panel and the at least one second antenna panel), such that the UE 120 may determine at least one of a transmission order, a frequency range, or a spatial channel (e.g., beam) that may be used by one or more antenna panels within a panel group. For example, when a panel group is configured for TDM, the panel switch pattern for the group may indicate a transmission order for antenna panels in the panel group (e.g., the at least one first antenna panel and the at least one second antenna panel may receive or transmit in a TDM fashion based on an ascending order of panel IDs or a descending order of panel IDs). In another example, when a panel group is configured with FDM, the panel switch pattern for the group may indicate a transmission frequency range for the antenna panels in the panel group (e.g., the at least one first antenna panel may receive or transmit in a higher half frequency band and the at least one second antenna panel may transmit or receive in a lower half frequency band).

In some aspects, the one or more first transmissions may include repetitions (e.g., across time as shown in example 600 and/or across frequency and/or space). Accordingly, as shown in connection with reference number 620, the UE 120 and the base station 110 may communicate the one or more first transmissions using the at least one first beam and the at least one first antenna panel.

Additionally, or alternatively, the one or more second transmissions may include repetitions (e.g., across time as shown in example 600 and/or across frequency and/or space). Accordingly, as shown in connection with reference number 625, the UE 120 and the base station 110 may communicate the one or more second transmissions using the at least one second beam (which, in example 600, is the same base station beam as the at least one first beam) and the at least one second antenna panel.

By using techniques as described in connection with FIG. 6, the base station 110 may indicate that a first antenna panel of the UE 120 should receive first transmissions using a beam and/or TCI state associated with the base station 110, and that a second antenna panel of the UE 120 should receive second transmissions using the same beam and/or TCI state associated with the base station 110. Accordingly, the base station 110 may use the same Tx beam and/or TCI state for repetition to different antenna panels in order to increase both reliability and quality of communications.

As indicated above, FIG. 6 is provided as an example. Other examples may differ from what is described with regard to FIG. 6.

Figure 7:
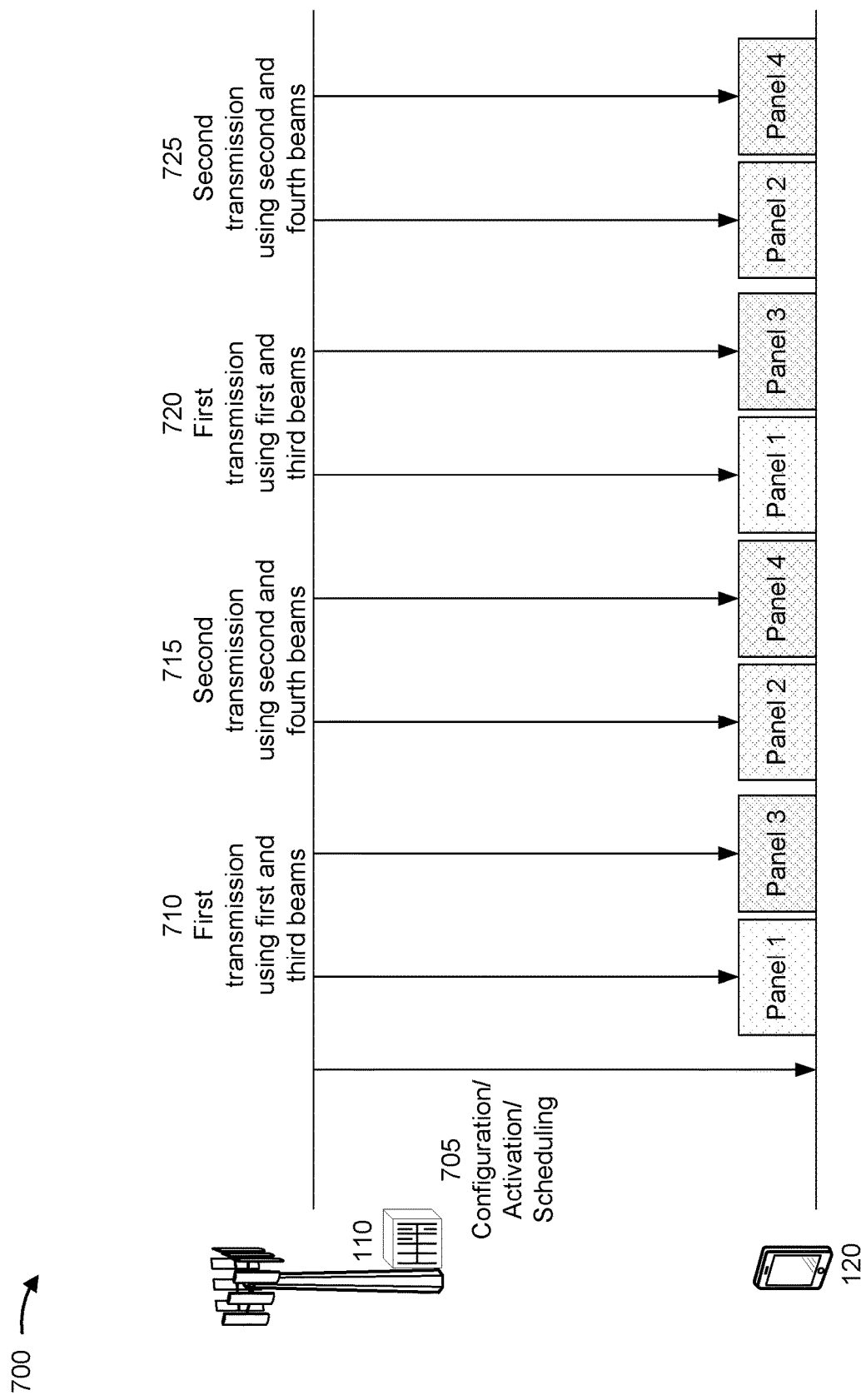

FIG. 7 is a diagram illustrating an example 700 associated with transmitting and receiving downlink reference signal reports for antenna panels, in accordance with the present disclosure. As shown in FIG. 7, example 700 includes communication between a base station 110 and a UE 120. In some aspects, the base station 110 and the UE 120 may be included in a wireless network, such as wireless network 100. The base station 110 and the UE 120 may communicate via a wireless access link, which may include an uplink and a downlink.

In some aspects, the UE 120 may include a plurality of antenna panels. In example 700, the UE 120 has four antenna panels, but other examples may include fewer antenna panels (e.g., two panels or three panels) or additional antenna panels (e.g., five panels, six panels, and so on). Each panel may include one or more antenna elements (e.g., cross-polarized elements and/or other similar antenna elements). In some aspects, an antenna panel may include a physical grouping of antenna elements (e.g., the elements are embedded in a same substrate and/or sharing one or more hardware components, such as a modulator, a demodulator, and/or a processor) and/or a virtual grouping of antenna elements (e.g., the elements are grouped by the UE 120 based at least in part on one or more properties of the elements). In some aspects, the UE 120 may assign antenna ports (e.g., as described in connection with FIG. 5) across antenna panels. For example, the UE 120 may assign one or more antenna port groups (e.g., where each group includes one or more antenna ports) across antenna panels (e.g., such that antenna port groups that cannot simultaneously transmit and/or simultaneously receive are included on a same antenna panel). Additionally, or alternatively, the UE 120 may assign antenna ports (e.g., as described in connection with FIG. 5) across antenna panels such that each antenna panel is associated with a group of beams (e.g., where each group includes one or more beams formed, for example, as described in connection with FIG. 3) that can be formed by the antenna ports included in that antenna panel.

As shown in connection with reference number 705, the base station 110 may transmit, and the UE 120 may receive, an RRC message to configure one or more first transmissions and one or more second transmissions, a control element (e.g., a MAC-CE and/or another control element) message to activate or schedule one or more first transmissions and one or more second transmissions, and/or a DCI message to schedule one or more first transmissions and one or more second transmissions. For example, the base station 110 may configure reference signal transmissions using the RRC message. In another example, the base station 110 may configure control channel messages using the control element message. In yet another example, the base station 110 may configure data transmissions using the DCI message.

In some aspects, the base station 110 may further transmit an indication of at least one first base station beam (e.g., formed using the hardware as described in connection with FIG. 3) and at least one first antenna panel of the UE 120, to use for the one or more first transmissions, and of at least one second base station beam (e.g., formed using the hardware as described in connection with FIG. 3) and at least one second antenna panel of the UE 120, to use for the one or more second transmissions. Additionally, the base station 110 may further indicate at least one third base station beam (e.g., formed using the hardware as described in connection with FIG. 3) and at least one third antenna panel of the UE 120, to use for the one or more first transmissions simultaneously with the at least one first base station beam and at least one first antenna panel of the UE 120, and/or indicate at least one fourth base station beam with at least one fourth antenna panel of the UE, 120 to use for the one or more second transmissions simultaneously with the at least one second base station beam and at least one second antenna panel of the UE 120. The base station 110 may use a single message or multiple messages for such indications. Although the description below focuses on the at least one first beam, the at least one second beam, the at least one third beam, and the at least one fourth beam, the description similarly applies to TCI states (e.g., as described in connection with FIG. 4). For example, the base station 110 may additionally, or alternatively, associate the at least one first antenna panel of the UE 120 with at least one first TCI state to use for the one or more first transmissions and associate the at least one second antenna panel of the UE 120 with at least one second TCI state to use for the one or more second transmissions. Additionally, the base station 110 may associate the at least one third antenna panel of the UE 120 with at least one third TCI state to use for the one or more first transmissions simultaneously with the at least one first TCI state and at least one first antenna panel of the UE 120, and associate the at least one fourth antenna panel of the UE 120 with at least one fourth TCI state to use for the one or more second transmissions simultaneously with the at least one second TCI state and at least one second antenna panel of the UE 120.

In some aspects, the indication of the at least one first antenna panel, of the UE 120, may include one or more panel identifiers associated with the at least one first antenna panel (e.g., as described in connection with FIG. 6) and/or one or more other identifiers, such as one or more beam group identifiers associated with the at least one first antenna panel (e.g., as described in connection with FIG. 6) and/or one or more antenna port group identifiers associated with the at least one first antenna panel (e.g., as described in connection with FIG. 6). Additionally, or alternatively, the indication of the at least one second antenna panel, of the UE 120, may similarly include one or more panel identifiers associated with the at least one second antenna panel and/or one or more other identifiers, such as one or more beam group identifiers associated with the at least one second antenna panel and/or one or more antenna port group identifiers associated with the at least one second antenna panel, as described above. Additionally, or alternatively, the indication of the at least one third antenna panel, of the UE 120, may similarly include one or more panel identifiers associated with the at least one third antenna panel and/or one or more other identifiers, such as one or more beam group identifiers associated with the at least one third antenna panel and/or one or more antenna port group identifiers associated with the at least one third antenna panel, as described above. Additionally, or alternatively, the indication of the at least one fourth antenna panel, of the UE 120, may similarly include one or more panel identifiers associated with the at least one fourth antenna panel and/or one or more other identifiers, such as one or more beam group identifiers associated with the at least one fourth antenna panel and/or one or more antenna port group identifiers associated with the at least one fourth antenna panel, as described above.

In example 700, the at least one first beam and the at least one second beam are associated with the base station and are the same base station beam, and the at least one third beam and the at least one fourth beam are associated with the base station 110 and are the same base station beam. Accordingly, when the one or more first transmissions and the one or more second transmissions are downlink transmissions, the base station 110 may use the same two base station beams to transmit simultaneously to the at last one first antenna panel and the at least one third antenna panel and simultaneously to the at last one second antenna panel and the at least one fourth antenna panel, and the UE 120 may use different beams that may be associated with different antenna panels to receive (e.g., by applying different reception filters based at least in part on the different beams). Similarly, when the one or more first transmissions and the one or more second transmissions are uplink transmissions, the base station 110 may use the same two base station beams to receive simultaneously from the at last one first antenna panel and the at least one third antenna panel and simultaneously from the at last one second antenna panel and the at least one fourth antenna panel, and the UE 120 may use different beams that may be associated with different antenna panels to transmit.

As shown in connection with reference number 710, the UE 120 and the base station 110 may communicate the one or more first transmissions using the at least one first beam and the at least one first antenna panel simultaneously with the at least one third beam and the at least one third antenna panel. In some aspects, the one or more first transmissions may include one or more downlink transmissions. For example, the one or more first transmissions may include PDCCH transmissions, PDSCH transmissions, CSI-RS transmissions, or a combination thereof. Accordingly, in some aspects, the at least one first beam may be a downlink beam or a joint uplink-downlink beam. Similarly, in some aspects, the at least one third beam may be a downlink beam or a joint uplink-downlink beam.

As an alternative, the one or more first transmissions may include one or more uplink transmissions. For example, the one or more first transmissions may include PUCCH transmissions, PUSCH transmissions, SRS transmissions, PRACH transmissions, or a combination thereof. Accordingly, in some aspects, the at least one first beam may be an uplink beam, a joint uplink-downlink beam, or spatial relation information. Similarly, in some aspects, the at least one third beam may be an uplink beam, a joint uplink-downlink beam, or spatial relation information.

As shown in connection with reference number 715, the UE 120 and the base station 110 may communicate the one or more second transmissions using the at least one second beam and the at least one second antenna panel simultaneously with the at least one fourth beam and the at least one fourth antenna panel. In some aspects, the one or more second transmissions may include one or more downlink transmissions. For example, the one or more second transmissions may include PDCCH transmissions, PDSCH transmissions, CSI-RS transmissions, or a combination thereof. Accordingly, in some aspects, the at least one second beam may be a downlink beam or a joint uplink-downlink beam. Similarly, in some aspects, the at least one fourth beam may be a downlink beam or a joint uplink-downlink beam.

As an alternative, the one or more second transmissions may include one or more uplink transmissions. For example, the one or more second transmissions may include PUCCH transmissions, PUSCH transmissions, SRS transmissions, PRACH transmissions, or a combination thereof. Accordingly, in some aspects, the at least one second beam may be an uplink beam, a joint uplink-downlink beam, or spatial relation information. Similarly, in some aspects, the at least one fourth beam may be an uplink beam, a joint uplink-downlink beam, or spatial relation information.

The one or more first transmissions and the one or more second transmissions may be multiplexed in space, frequency, time, or a combination thereof. In example 700, the one or more first transmissions and the one or more second transmissions are multiplexed in time. In other examples, the one or more first transmissions and the one or more second transmissions may additionally or alternatively be multiplexed in space (e.g., associated with different beams) and/or frequency (e.g., at least partially orthogonal in frequency). The base station 110 may therefore indicate a multiplexing method and/or a panel switch pattern, as described in connection with FIG. 6.

In some aspects, the one or more first transmissions may include repetitions (e.g., across time as shown in example 700 and/or across frequency and/or space). Accordingly, as shown in connection with reference number 720, the UE 120 and the base station 110 may communicate the one or more first transmissions using the at least one first beam and the at least one first antenna panel simultaneously with the at least one third beam and the at least one third antenna panel.

Additionally, or alternatively, the one or more second transmissions may include repetitions (e.g., across time as shown in example 600 and/or across frequency and/or space). Accordingly, as shown in connection with reference number 725, the UE 120 and the base station 110 may communicate the one or more second transmissions using the at least one second beam (which, in example 700, is the same base station beam as the at least one first beam) and the at least one second antenna panel simultaneously with the at least one fourth beam (which, in example 700, is the same base station beam as the at least one third beam) and the at least one fourth antenna panel.

By using techniques as described in connection with FIG. 7, the base station 110 may use the same Tx beam and/or TCI state for repetition to different antenna panels in order to increase both reliability and quality of communications. In another example, the base station may indicate that a first antenna panel and a third antenna panel of the UE 120 should receive simultaneous first transmissions using a first beam and/or TCI state and a second beam and/or TCI state associated with the base station 110, and that a second antenna panel and a fourth antenna panel of the UE 120 should receive simultaneous second transmissions using the same Tx beams and/or TCI states associated with the base station 110. Accordingly, the base station 110 may use the same Tx beam and/or TCI state for repetition to different antenna panels during simultaneous transmission in order to increase both reliability and quality of communications.

Example 700 may be combined with example 600. In some aspects, the base station 110 may indicate at least one first beam (e.g., formed using the hardware as described in connection with FIG. 3) and at least one first antenna panel of the UE 120, to use for one or more first transmissions; at least one second beam (e.g., formed using the hardware as described in connection with FIG. 3) and at least one second antenna panel of the UE 120, to use for one or more second transmissions; and at least one third beam (e.g., formed using the hardware as described in connection with FIG. 3) and at least one third antenna panel of the UE 120, to use for the one or more second transmissions simultaneously with the at least one second beam and at least one second antenna panel of the UE 120. Accordingly, the UE 120 and the base station 110 may communicate the one or more first transmissions using the at least one first beam and the at least one first antenna panel. Additionally, the UE 120 and the base station 110 may communicate the one or more second transmissions using the at least one second beam and the at least one second antenna panel simultaneously with the at least one third beam and the at least one third antenna panel.

As indicated above, FIG. 7 is provided as an example. Other examples may differ from what is described with regard to FIG. 7.

Figure 8:
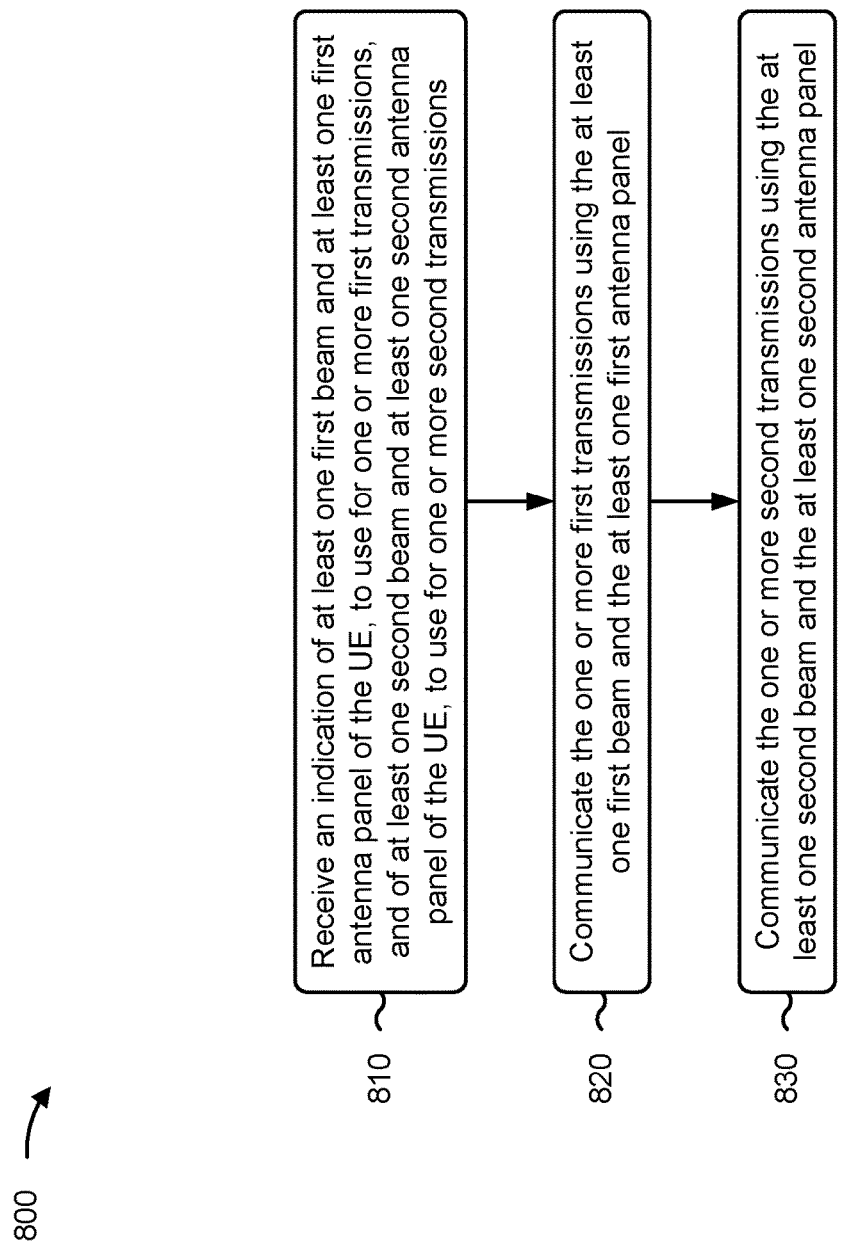
FIGS. 8 and 9 are diagrams illustrating example processes associated with using different antenna panels across transmissions, in accordance with the present disclosure.

FIG. 8 is a diagram illustrating an example process 800 performed, for example, by a UE, in accordance with the present disclosure. Example process 800 is an example where the UE (e.g., UE 120 and/or apparatus 1000 of FIG. 10) performs operations associated with using different antenna panels across transmissions.

As shown in FIG. 8, in some aspects, process 800 may include receiving, from a base station (e.g., base station 110 and/or apparatus 1100 of FIG. 11), an indication of at least one first beam and at least one first antenna panel of the UE, to use for one or more first transmissions, and of at least one second beam and at least one second antenna panel of the UE, to use for one or more second transmissions (block 810). For example, the UE (e.g., using reception component 1002, depicted in FIG. 10) may receive, from a base station, an indication of at least one first beam and at least one first antenna panel of the UE, to use for one or more first transmissions, and of at least one second beam and at least one second antenna panel of the UE, to use for one or more second transmissions, as described herein.

As further shown in FIG. 8, in some aspects, process 800 may include communicating the one or more first transmissions, using the at least one first beam and the at least one first antenna panel (block 820). For example, the UE (e.g., using reception component 1002 and/or transmission component 1004, depicted in FIG. 10) may communicate the one or more first transmissions, with the base station, using the at least one first beam and the at least one first antenna panel, as described herein.

As further shown in FIG. 8, in some aspects, process 800 may include communicating the one or more second transmissions, with the base station, using the at least one second beam and the at least one second antenna panel (block 830). For example, the UE (e.g., using reception component 1002 and/or transmission component 1004) may communicate the one or more second transmissions, with the base station, using the at least one second beam and the at least one second antenna panel, as described herein.

Process 800 may include additional aspects, such as any single aspect or any combination of aspects described below and/or in connection with one or more other processes described elsewhere herein.

In a first aspect, the indication of the at least one first antenna panel, of the UE, includes one or more panel identifiers associated with the at least one first antenna panel, one or more beam group identifiers associated with the at least one first antenna panel, or one or more antenna port group identifiers associated with the at least one first antenna panel.

In a second aspect, alone or in combination with the first aspect, the indication of the at least one second antenna panel, of the UE, includes one or more panel identifiers associated with the at least one second antenna panel, one or more beam group identifiers associated with the at least one second antenna panel, or one or more antenna port group identifiers associated with the at least one second antenna panel.

In a third aspect, alone or in combination with one or more of the first and second aspects, the one or more first transmissions and the one or more second transmissions are configured by a same RRC message, activated by a same MAC-CE message, or scheduled by a same DCI message.

In a fourth aspect, alone or in combination with one or more of the first through third aspects, the at least one first beam and the at least one second beam are associated with the base station and are the same beam, and the at least one first antenna panel of the UE and the at least one second antenna panel of the UE are different panels.

In a fifth aspect, alone or in combination with one or more of the first through fourth aspects, the one or more first transmissions are associated with at least one first UE beam of the at least one first antenna panel of the UE, the one or more second transmissions are associated with at least one second UE beam of the at least one second antenna panel of the UE, and the at least one first UE beam and the at least one second UE beam are different beams.

In a sixth aspect, alone or in combination with one or more of the first through fifth aspects, the one or more first transmissions and the one or more second transmissions are downlink transmissions.

In a seventh aspect, alone or in combination with one or more of the first through sixth aspects, the one or more first transmissions and the one or more second transmissions include PDCCH transmissions, PDSCH transmissions, CSI-RS transmissions, or a combination thereof.

In an eighth aspect, alone or in combination with one or more of the first through seventh aspects, the at least one first beam is a downlink beam or a joint uplink-downlink beam, and the at least one second beam is a downlink beam or a joint uplink-downlink beam.

In a ninth aspect, alone or in combination with one or more of the first through eighth aspects, the one or more first transmissions and the one or more second transmissions are uplink transmissions.

In a tenth aspect, alone or in combination with one or more of the first through ninth aspects, the one or more first transmissions and the one or more second transmissions include PUCCH transmissions, PUSCH transmissions, SRS transmissions, PRACH transmissions, or a combination thereof.

In an eleventh aspect, alone or in combination with one or more of the first through tenth aspects, the at least one first beam is an uplink beam, a joint uplink-downlink beam, or spatial relation information, and the at least one second beam is an uplink beam, a joint uplink-downlink beam, or spatial relation information.

In a twelfth aspect, alone or in combination with one or more of the first through eleventh aspects, the one or more first transmissions and the one or more second transmissions are multiplexed in space, frequency, time, or a combination thereof.

In a thirteenth aspect, alone or in combination with one or more of the first through twelfth aspects, the indication associates the at least one first antenna panel of the UE and the at least one second antenna panel of the UE with a multiplexing method.

In a fourteenth aspect, alone or in combination with one or more of the first through thirteenth aspects, the indication includes an index associated with a pattern that includes the at least one first beam associated with the at least one first antenna panel of the UE and the at least one second beam associated with the at least one second antenna panel of the UE.

In a fifteenth aspect, alone or in combination with one or more of the first through fourteenth aspects, the indication further associates at least one third beam with at least one third antenna panel of the UE, to use for the one or more first transmissions simultaneously with the at least one first beam and at least one first antenna panel of the UE.

In a sixteenth aspect, alone or in combination with one or more of the first through fifteenth aspects, the indication further associates at least one fourth beam with at least one fourth antenna panel of the UE, to use for the one or more second transmissions simultaneously with the at least one second beam and at least one second antenna panel of the UE.

In a seventeenth aspect, alone or in combination with one or more of the first through sixteenth aspects, the at least one first beam and the at least one second beam are associated with the base station and are the same beam, and the at least one third beam and the at least one fourth beam are associated with the base station and are the same beam.

In an eighteenth aspect, alone or in combination with one or more of the first through seventeenth aspects, the one or more first transmissions are associated with at least one first UE beam of the at least one first antenna panel of the UE, the one or more second transmissions are associated with at least one second UE beam of the at least one second antenna panel of the UE, and the at least one first UE beam and the at least one second UE beam are different beams.

In a nineteenth aspect, alone or in combination with one or more of the first through eighteenth aspects, the indication includes scheduling information associated with the one or more first transmissions, the one or more first transmissions, or a combination thereof.

In a twentieth aspects, alone or in combination with one or more of the first through nineteenth aspects, process 800 further includes transmitting (e.g., using transmission component 1004), to the base station, information associated with the at least one first antenna panel of the UE and the at least one second antenna panel of the UE, such that the indication is received based at in part on the information.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
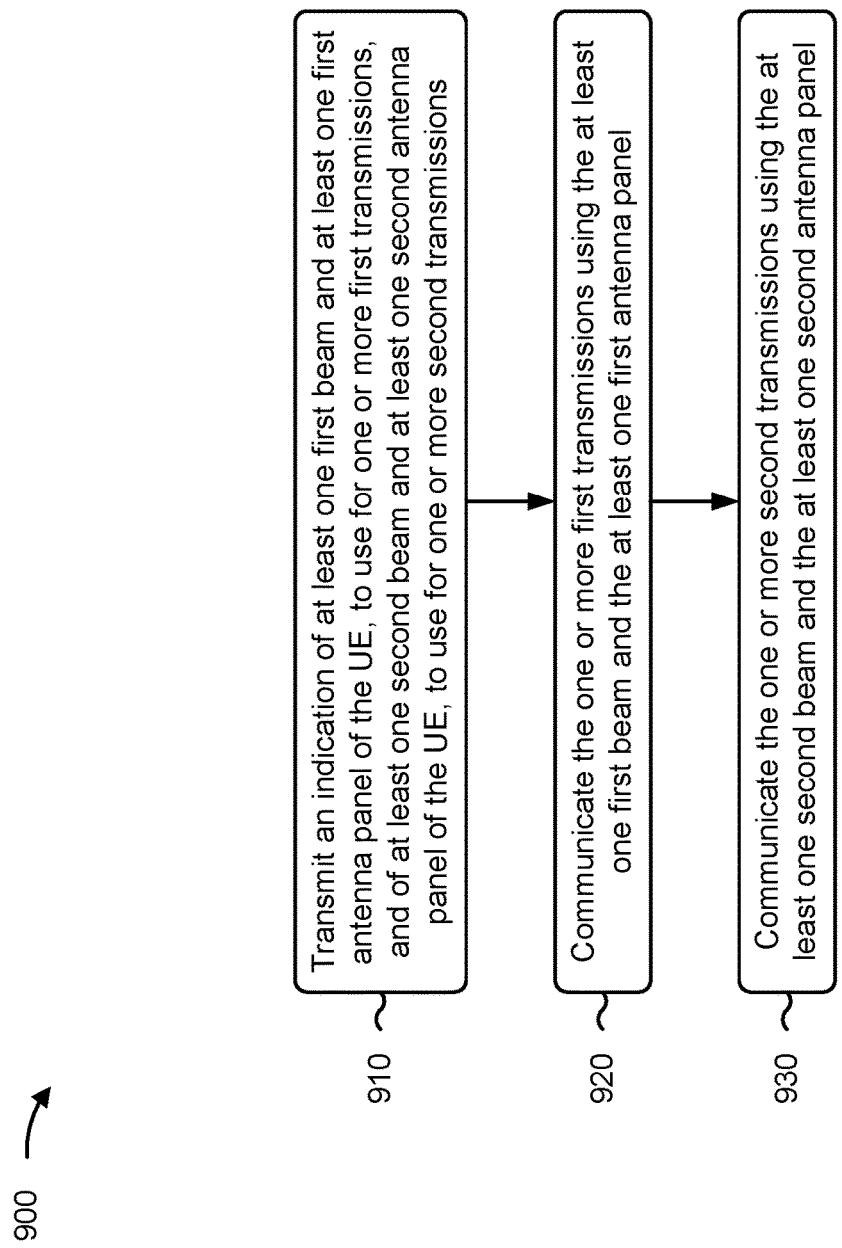

FIG. 9 is a diagram illustrating an example process 900 performed, for example, by a base station, in accordance with the present disclosure. Example process 900 is an example where the base station (e.g., base station 110 and/or apparatus 1100 of FIG. 11) performs operations associated with using different antenna panels across transmissions.

As shown in FIG. 9, in some aspects, process 900 may include transmitting, to a UE (e.g., UE 120 and/or apparatus 1000 of FIG. 10), an indication of at least one first beam and at least one first antenna panel of the UE, to use for one or more first transmissions, and of at least one second beam and at least one second antenna panel of the UE, to use for one or more second transmissions (block 910). For example, the base station (e.g., using transmission component 1104, depicted in FIG. 1) may transmit, to a UE, ab indication of at least one first beam and at least one first antenna panel of the UE, to use for one or more first transmissions, and of at least one second beam and at least one second antenna panel of the UE, to use for one or more second transmissions, as described herein.

As further shown in FIG. 9, in some aspects, process 900 may include communicating the one or more first transmissions, with the UE, using the at least one first beam and the at least one first antenna panel (block 920). For example, the base station (e.g., using transmission component 1104 and/or reception component 1102, depicted in FIG. 11) may communicate the one or more first transmissions, with the UE, using the at least one first beam and the at least one first antenna panel, as described herein.

As further shown in FIG. 9, in some aspects, process 900 may include communicating the one or more second transmissions, with the UE, using the at least one second beam and the at least one second antenna panel (block 930). For example, the base station (e.g., using transmission component 1104 and/or reception component 1102) may communicate the one or more second transmissions, with the UE, using the at least one second beam and the at least one second antenna panel, as described herein.

Process 900 may include additional aspects, such as any single aspect or any combination of aspects described below and/or in connection with one or more other processes described elsewhere herein.

In a first aspect, the indication of the at least one first antenna panel, of the UE, includes one or more panel identifiers associated with the at least one first antenna panel, one or more beam group identifiers associated with the at least one first antenna panel, or one or more antenna port group identifiers associated with the at least one first antenna panel.

In a second aspect, alone or in combination with the first aspect, the indication of the at least one second antenna panel, of the UE, includes one or more panel identifiers associated with the at least one second antenna panel, one or more beam group identifiers associated with the at least one second antenna panel, or one or more antenna port group identifiers associated with the at least one second antenna panel.

In a third aspect, alone or in combination with one or more of the first and second aspects, the one or more first transmissions and the one or more second transmissions are configured by a same RRC message, activated by a same MAC-CE message, or scheduled by a same DCI message.

In a fourth aspect, alone or in combination with one or more of the first through third aspects, the at least one first beam and the at least one second beam are associated with the base station and are the same beam, and the at least one first antenna panel of the UE and the at least one second antenna panel of the UE are different panels.

In a fifth aspect, alone or in combination with one or more of the first through fourth aspects, the one or more first transmissions are associated with at least one first UE beam of the at least one first antenna panel of the UE, the one or more second transmissions are associated with at least one second UE beam of the at least one second antenna panel of the UE, and the at least one first UE beam and the at least one second UE beam are different beams.

In a sixth aspect, alone or in combination with one or more of the first through fifth aspects, the one or more first transmissions and the one or more second transmissions are downlink transmissions.

In a seventh aspect, alone or in combination with one or more of the first through sixth aspects, the one or more first transmissions and the one or more second transmissions include PDCCH transmissions, PDSCH transmissions, CSI-RS transmissions, or a combination thereof.

In an eighth aspect, alone or in combination with one or more of the first through seventh aspects, the at least one first beam is a downlink beam or a joint uplink-downlink beam, and the at least one second beam is a downlink beam or a joint uplink-downlink beam.

In a ninth aspect, alone or in combination with one or more of the first through eighth aspects, the one or more first transmissions and the one or more second transmissions are uplink transmissions.

In a tenth aspect, alone or in combination with one or more of the first through ninth aspects, the one or more first transmissions and the one or more second transmissions include PUCCH transmissions, PUSCH transmissions, SRS transmissions, PRACH transmissions, or a combination thereof.

In an eleventh aspect, alone or in combination with one or more of the first through tenth aspects, the at least one first beam is an uplink beam, a joint uplink-downlink beam, or spatial relation information, and the at least one second beam is an uplink beam, a joint uplink-downlink beam, or spatial relation information.

In a twelfth aspect, alone or in combination with one or more of the first through eleventh aspects, the one or more first transmissions and the one or more second transmissions are multiplexed in space, frequency, time, or a combination thereof.

In a thirteenth aspect, alone or in combination with one or more of the first through twelfth aspects, the indication associates the at least one first antenna panel of the UE and the at least one second antenna panel of the UE with a multiplexing method.

In a fourteenth aspect, alone or in combination with one or more of the first through thirteenth aspects, the indication includes an index associated with a pattern that includes the at least one first beam associated with the at least one first antenna panel of the UE and the at least one second beam associated with the at least one second antenna panel of the UE.

In a fifteenth aspect, alone or in combination with one or more of the first through fourteenth aspects, the indication further associates at least one third beam with at least one third antenna panel of the UE, to use for the one or more first transmissions simultaneously with the at least one first beam and at least one first antenna panel of the UE.

In a sixteenth aspect, alone or in combination with one or more of the first through fifteenth aspects, the indication further associates at least one fourth beam with at least one fourth antenna panel of the UE, to use for the one or more second transmissions simultaneously with the at least one second beam and at least one second antenna panel of the UE.

In a seventeenth aspect, alone or in combination with one or more of the first through sixteenth aspects, the at least one first beam and the at least one second beam are associated with the base station and are the same beam, and the at least one third beam and the at least one fourth beam are associated with the base station and are the same beam.

In an eighteenth aspect, alone or in combination with one or more of the first through seventeenth aspects, the one or more first transmissions are associated with at least one first UE beam of the at least one first antenna panel of the UE, the one or more second transmissions are associated with at least one second UE beam of the at least one second antenna panel of the UE, and the at least one first UE beam and the at least one second UE beam are different beams.

In a nineteenth aspect, alone or in combination with one or more of the first through eighteenth aspects, the indication includes scheduling information associated with the one or more first transmissions, the one or more first transmissions, or a combination thereof.

In a twentieth aspects, alone or in combination with one or more of the first through nineteenth aspects, process 900 further includes receiving (e.g., using reception component 1102), from the UE, information associated with the at least one first antenna panel of the UE and the at least one second antenna panel of the UE, such that the indication is transmitted based at in part on the information.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
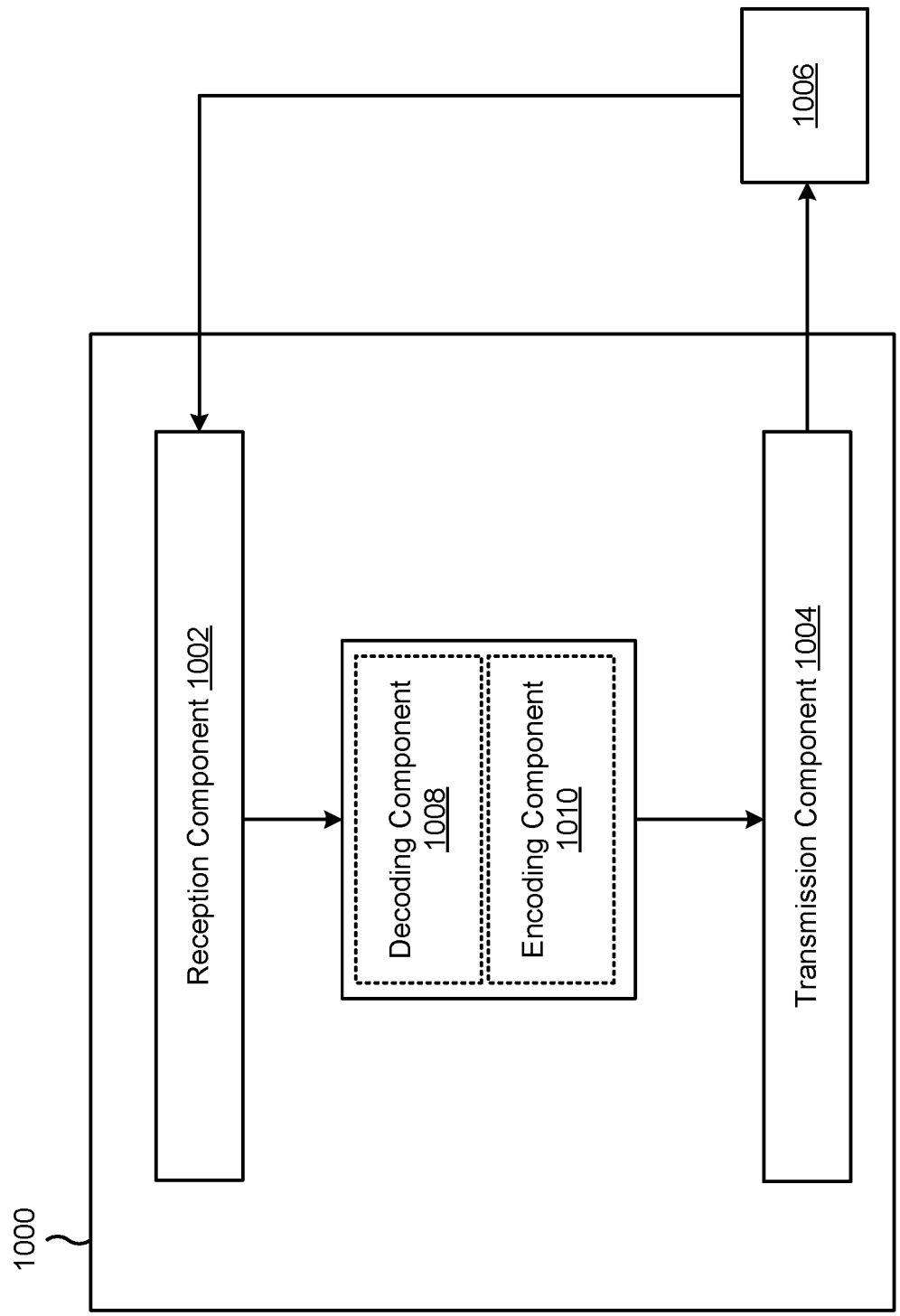
FIGS. 10 and 11 are diagrams of example apparatuses for wireless communication, in accordance with the present disclosure.

FIG. 10 is a block diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include one or more of a decoding component 1008 or an encoding component 1010, among other examples.

In some aspects, the apparatus 1000 may be configured to perform one or more operations described herein in connection with FIGS. 6-7. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the UE described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a demodulator, a MIMO detector, a receive processor, a controller/processor, a memory, or a combination thereof, of the UE described above in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the UE described above in connection with FIG. 2. In some aspects, the transmission component 1004 may be co-located with the reception component 1002 in a transceiver.

In some aspects, the reception component 1002 may receive, from the apparatus 1006, an indication of at least one first beam and at least one first antenna panel of the apparatus 1000, to use for one or more first transmissions, and of at least one second beam and at least one second antenna panel of the apparatus 1000, to use for one or more second transmissions. Accordingly, the reception component 1002 and/or the transmission component 1004 may communicate the one or more first transmissions, with the apparatus 1006, using the at least one first beam and the at least one first antenna panel. For example, the reception component 1002 may receive the one or more first transmissions, and the decoding component 1008 may demodulate and/or decode the one or more first transmissions. In some aspects, the decoding component 1008 may include a demodulator, a MIMO detector, a receive processor, a controller/processor, a memory, or a combination thereof, of the UE described above in connection with FIG. 2. As an alternative, the encoding component 1010 may modulate and/or encode the one or more first transmissions, and the transmission component 1004 may transmit the one or more first transmissions. In some aspects, the encoding component 1010 may include a modulator, a transmit MIMO processor, a transmit processor, a controller/processor, a memory, or a combination thereof, of the UE described above in connection with FIG. 2. Additionally, the reception component 1002 and/or the transmission component 1004 may communicate the one or more second transmissions, with the apparatus 1006, using the at least one second beam and the at least one second antenna panel. For example, the reception component 1002 may receive the one or more second transmissions, and the decoding component 1008 may demodulate and/or decode the one or more second transmissions. As an alternative, the encoding component 1010 may modulate and/or encode the one or more second transmissions, and the transmission component 1004 may transmit the one or more second transmissions.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
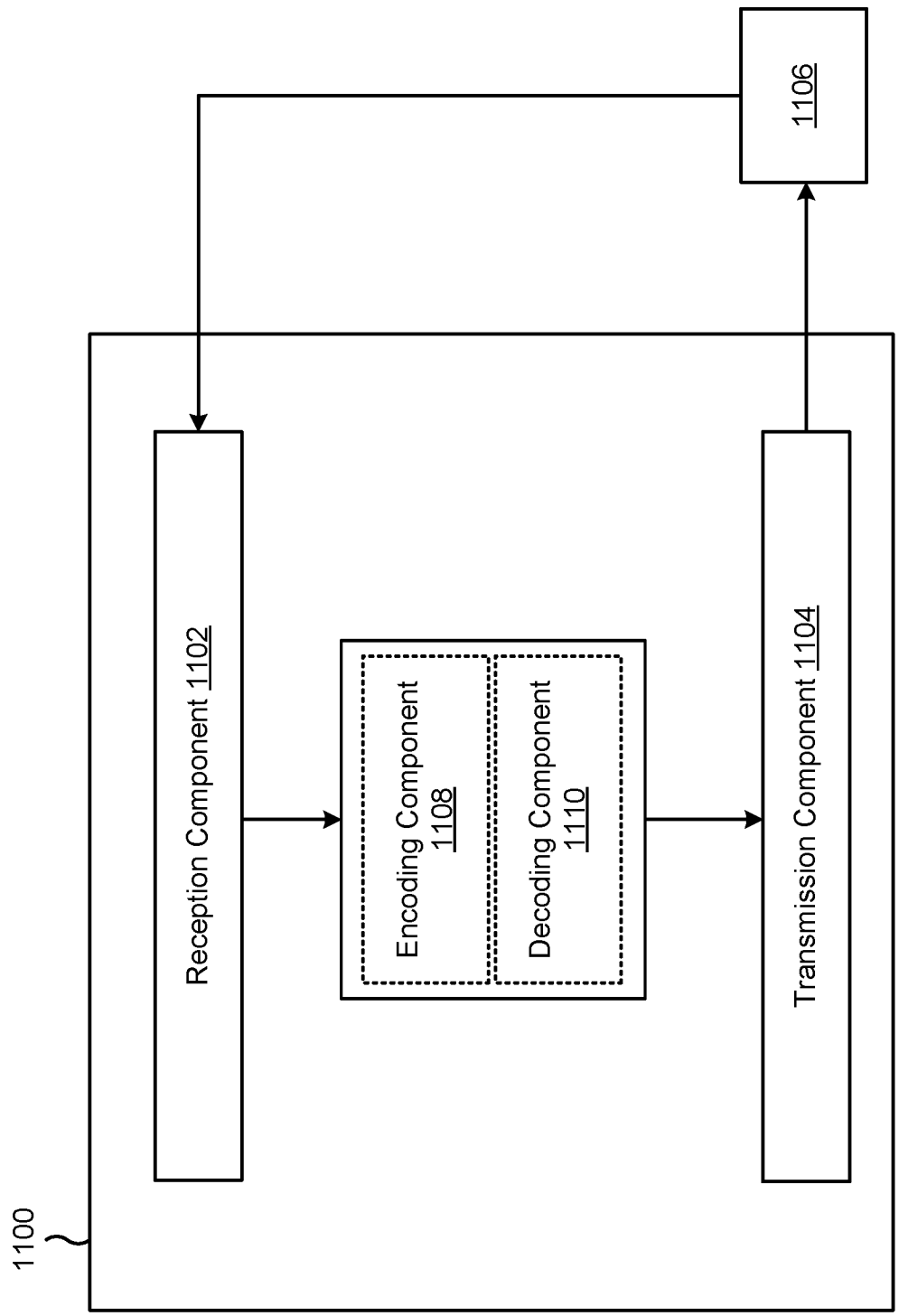

FIG. 11 is a block diagram of an example apparatus 1100 for wireless communication. The apparatus 1100 may be a base station, or a base station may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include one or more of an encoding component 1108 or a decoding component 1110, among other examples.

In some aspects, the apparatus 1100 may be configured to perform one or more operations described herein in connection with FIGS. 6-7. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the base station described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a demodulator, a MIMO detector, a receive processor, a controller/processor, a memory, or a combination thereof, of the base station described above in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the base station described above in connection with FIG. 2. In some aspects, the transmission component 1104 may be co-located with the reception component 1102 in a transceiver.

In some aspects, the transmission component 1104 may transmit, to the apparatus 1106, an indication of at least one first beam and at least one first antenna panel of the apparatus 1106, to use for one or more first transmissions, and of at least one second beam and at least one second antenna panel of the apparatus 1106, to use for one or more second transmissions. Accordingly, the transmission component 1104 and/or the reception component 1102 may communicate the one or more first transmissions, with the apparatus 1106, using the at least one first beam and the at least one first antenna panel. For example, the encoding component 1108 may modulate and/or encode the one or more first transmissions, and the transmission component 1104 may transmit the one or more first transmissions. In some aspects, the encoding component 1108 may include a modulator, a transmit MIMO processor, a transmit processor, a controller/processor, a memory, or a combination thereof, of the base station described above in connection with FIG. 2. As an alternative, the reception component 1102 may receive the one or more first transmissions, and the decoding component 1110 may demodulate and/or decode the one or more first transmissions. In some aspects, the decoding component 1110 may include a demodulator, a MIMO detector, a receive processor, a controller/processor, a memory, or a combination thereof, of the base station described above in connection with FIG. 2. Additionally, the transmission component 1104 and/or the reception component 1102 may communicate the one or more second transmissions, with the apparatus 1106, using the at least one second beam and the at least one second antenna panel. For example, the encoding component 1108 may modulate and/or encode the one or more second transmissions, and the transmission component 1104 may transmit the one or more second transmissions. As an alternative, the reception component 1102 may receive the one or more second transmissions, and the decoding component 1110 may demodulate and/or decode the one or more second transmissions.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: receiving, from a base station, an indication of at least one first beam and at least one first antenna panel of the UE, to use for one or more first transmissions, and of at least one second beam and at least one second antenna panel of the UE, to use for one or more second transmissions; communicating the one or more first transmissions, with the base station, using the at least one first beam and the at least one first antenna panel; and communicating the one or more second transmissions, with the base station, using the at least one second beam and the at least one second antenna panel.

Aspect 2: The method of Aspect 1, wherein the indication of the at least one first antenna panel, of the UE, includes one or more panel identifiers associated with the at least one first antenna panel, one or more beam group identifiers associated with the at least one first antenna panel, or one or more antenna port group identifiers associated with the at least one first antenna panel.

Aspect 3: The method of any of Aspects 1 through 2, wherein the indication of the at least one second antenna panel, of the UE, includes one or more panel identifiers associated with the at least one second antenna panel, one or more beam group identifiers associated with the at least one second antenna panel, or one or more antenna port group identifiers associated with the at least one second antenna panel.

Aspect 4: The method of any of Aspects 1 through 3, wherein the one or more first transmissions and the one or more second transmissions are configured by a same radio resource control (RRC) message, activated by a same medium access control (MAC) control element (MAC-CE) message, or scheduled by a same downlink control information (DCI) message.

Aspect 5: The method of any of Aspects 1 through 4, wherein the at least one first beam and the at least one second beam are associated with the base station and are the same beam, and the at least one first antenna panel of the UE and the at least one second antenna panel of the UE are different panels.

Aspect 6: The method of Aspect 5, wherein the one or more first transmissions are associated with at least one first UE beam of the at least one first antenna panel of the UE, the one or more second transmissions are associated with at least one second UE beam of the at least one second antenna panel of the UE, and the at least one first UE beam and the at least one second UE beam are different beams.

Aspect 7: The method of any of Aspects 1 through 6, wherein the one or more first transmissions and the one or more second transmissions are downlink transmissions.

Aspect 8: The method of Aspect 7, wherein the one or more first transmissions and the one or more second transmissions include physical downlink control channel (PDCCH) transmissions, physical downlink shared channel (PDSCH) transmissions, channel state information reference signal (CSI-RS) transmissions, or a combination thereof.

Aspect 9: The method of any of Aspects 7 through 8, wherein the at least one first beam is a downlink beam or a joint uplink-downlink beam, and wherein the at least one second beam is a downlink beam or a joint uplink-downlink beam.

Aspect 10: The method of any of Aspects 1 through 6, wherein the one or more first transmissions and the one or more second transmissions are uplink transmissions.

Aspect 11: The method of Aspect 10, wherein the one or more first transmissions and the one or more second transmissions include physical uplink control channel (PUCCH) transmissions, physical uplink shared channel (PUSCH) transmissions, sounding reference signal (SRS) transmissions, physical random access channel (PRACH) transmissions, or a combination thereof.

Aspect 12: The method of any of Aspects 10 through 11, wherein the at least one first beam is an uplink beam, a joint uplink-downlink beam, or spatial relation information, and wherein the at least one second beam is an uplink beam, a joint uplink-downlink beam, or spatial relation information.

Aspect 13: The method of any of Aspects 1 through 12, wherein the one or more first transmissions and the one or more second transmissions are multiplexed in space, frequency, time, or a combination thereof.

Aspect 14: The method of Aspect 13, wherein the indication associates the at least one first antenna panel of the UE and the at least one second antenna panel of the UE with a multiplexing method.

Aspect 15: The method of any of Aspects 1 through 14, wherein the indication includes an index associated with a pattern that includes the at least one first beam associated with the at least one first antenna panel of the UE and the at least one second beam associated with the at least one second antenna panel of the UE.

Aspect 16: The method of any of Aspects 1 through 15, wherein the indication further associates at least one third beam with at least one third antenna panel of the UE, to use for the one or more first transmissions simultaneously with the at least one first beam and at least one first antenna panel of the UE.

Aspect 17: The method of Aspect 16, wherein the indication further associates at least one fourth beam with at least one fourth antenna panel of the UE, to use for the one or more second transmissions simultaneously with the at least one second beam and at least one second antenna panel of the UE.

Aspect 18: The method of Aspect 17, wherein the at least one first beam and the at least one second beam are associated with the base station and are the same beam, and wherein the at least one third beam and the at least one fourth beam are associated with the base station and are the same beam.

Aspect 19: The method of Aspect 18, wherein the one or more first transmissions are associated with at least one first UE beam of the at least one first antenna panel of the UE, the one or more second transmissions are associated with at least one second UE beam of the at least one second antenna panel of the UE, and the at least one first UE beam and the at least one second UE beam are different beams.

Aspect 20: The method of any of Aspects 1 through 19, wherein the indication includes scheduling information associated with the one or more first transmissions, the one or more first transmissions, or a combination thereof.

Aspect 21: The method of any of Aspects 1 through 20, further comprising: transmitting, to the base station, information associated with the at least one first antenna panel of the UE and the at least one second antenna panel of the UE, wherein the indication is received based at in part on the information.

Aspect 22: A method of wireless communication performed by a base station, comprising: transmitting, to a user equipment (UE), an indication of at least one first beam and at least one first antenna panel of the UE, to use for one or more first transmissions, and of at least one second beam and at least one second antenna panel of the UE, to use for one or more second transmissions; communicating the one or more first transmissions, with the UE, using the at least one first beam and the at least one first antenna panel; and communicating the one or more second transmissions, with the UE, using the at least one second beam and the at least one second antenna panel.

Aspect 23: The method of Aspect 22, wherein the indication of the at least one first antenna panel, of the UE, includes one or more panel identifiers associated with the at least one first antenna panel, one or more beam group identifiers associated with the at least one first antenna panel, or one or more antenna port group identifiers associated with the at least one first antenna panel.

Aspect 24: The method of any of Aspects 22 through 23, wherein the indication of the at least one second antenna panel, of the UE, includes one or more panel identifiers associated with the at least one second antenna panel, one or more beam group identifiers associated with the at least one second antenna panel, or one or more antenna port group identifiers associated with the at least one second antenna panel.

Aspect 25: The method of any of Aspects 22 through 24, wherein the one or more first transmissions and the one or more second transmissions are configured by a same radio resource control (RRC) message, activated by a same medium access control (MAC) control element (MAC-CE) message, or scheduled by a same downlink control information (DCI) message.

Aspect 26: The method of any of Aspects 22 through 25, wherein the at least one first beam and the at least one second beam are associated with the base station and are the same beam, and the at least one first antenna panel of the UE and the at least one second antenna panel of the UE are different panels.

Aspect 27: The method of Aspect 26, wherein the one or more first transmissions are associated with at least one first UE beam of the at least one first antenna panel of the UE, the one or more second transmissions are associated with at least one second UE beam of the at least one second antenna panel of the UE, and the at least one first UE beam and the at least one second UE beam are different beams.

Aspect 28: The method of any of Aspects 22 through 27, wherein the one or more first transmissions and the one or more second transmissions are downlink transmissions.

Aspect 29: The method of Aspect 28, wherein the one or more first transmissions and the one or more second transmissions include physical downlink control channel (PDCCH) transmissions, physical downlink shared channel (PDSCH) transmissions, channel state information reference signal (CSI-RS) transmissions, or a combination thereof.

Aspect 30: The method of any of Aspects 28 through 29, wherein the at least one first beam is a downlink beam or a joint uplink-downlink beam, and wherein the at least one second beam is a downlink beam or a joint uplink-downlink beam.

Aspect 31: The method of any of Aspects 22 through 30, wherein the one or more first transmissions and the one or more second transmissions are uplink transmissions.

Aspect 32: The method of Aspect 31, wherein the one or more first transmissions and the one or more second transmissions include physical uplink control channel (PUCCH) transmissions, physical uplink shared channel (PUSCH) transmissions, sounding reference signal (SRS) transmissions, physical random access channel (PRACH) transmissions, or a combination thereof.

Aspect 33: The method of any of Aspects 31 through 32, wherein the at least one first beam is an uplink beam, a joint uplink-downlink beam, or spatial relation information, and wherein the at least one second beam is an uplink beam, a joint uplink-downlink beam, or spatial relation information.

Aspect 34: The method of any of Aspects 22 through 33, wherein the one or more first transmissions and the one or more second transmissions are multiplexed in space, frequency, time, or a combination thereof.

Aspect 35: The method of Aspect 34, wherein the indication associates the at least one first antenna panel of the UE and the at least one second antenna panel of the UE with a multiplexing method.

Aspect 36: The method of any of Aspects 22 through 35, wherein the indication includes an index associated with a pattern that includes the at least one first beam associated with the at least one first antenna panel of the UE and the at least one second beam associated with the at least one second antenna panel of the UE.

Aspect 37: The method of any of Aspects 22 through 36, wherein the indication further associates at least one third beam with at least one third antenna panel of the UE, to use for the one or more first transmissions simultaneously with the at least one first beam and at least one first antenna panel of the UE.

Aspect 38: The method of Aspect 37, wherein the indication further associates at least one fourth beam with at least one fourth antenna panel of the UE, to use for the one or more second transmissions simultaneously with the at least one second beam and at least one second antenna panel of the UE.

Aspect 39: The method of Aspect 38, wherein the at least one first beam and the at least one second beam are associated with the base station and are the same beam, and wherein the at least one third beam and the at least one fourth beam are associated with the base station and are the same beam.

Aspect 40: The method of Aspect 39, wherein the one or more first transmissions are associated with at least one first UE beam of the at least one first antenna panel of the UE, the one or more second transmissions are associated with at least one second UE beam of the at least one second antenna panel of the UE, and the at least one first UE beam and the at least one second UE beam are different beams.

Aspect 41: The method of any of Aspects 1 through 40, wherein the indication includes scheduling information associated with the one or more first transmissions, the one or more first transmissions, or a combination thereof.

Aspect 42: The method of any of Aspects 1 through 41, further comprising: receiving, from the UE, information associated with the at least one first antenna panel of the UE and the at least one second antenna panel of the UE, wherein the indication is transmitted based at in part on the information.

Aspect 43: An apparatus for wireless communication at a device, comprising a processor; memory coupled with the processor; and instructions stored in the memory and executable by the processor to cause the apparatus to perform the method of one or more of Aspects 1-21.

Aspect 44: A device for wireless communication, comprising a memory and one or more processors coupled to the memory, the one or more processors configured to perform the method of one or more of Aspects 1-21.

Aspect 45: An apparatus for wireless communication, comprising at least one means for performing the method of one or more of Aspects 1-21.

Aspect 46: A non-transitory computer-readable medium storing code for wireless communication, the code comprising instructions executable by a processor to perform the method of one or more of Aspects 1-21.

Aspect 47: A non-transitory computer-readable medium storing a set of instructions for wireless communication, the set of instructions comprising one or more instructions that, when executed by one or more processors of a device, cause the device to perform the method of one or more of Aspects 1-21.

Aspect 48: An apparatus for wireless communication at a device, comprising a processor; memory coupled with the processor; and instructions stored in the memory and executable by the processor to cause the apparatus to perform the method of one or more of Aspects 22-42.

Aspect 49: A device for wireless communication, comprising a memory and one or more processors coupled to the memory, the one or more processors configured to perform the method of one or more of Aspects 22-42.

Aspect 50: An apparatus for wireless communication, comprising at least one means for performing the method of one or more of Aspects 22-42.

Aspect 51: A non-transitory computer-readable medium storing code for wireless communication, the code comprising instructions executable by a processor to perform the method of one or more of Aspects 22-42.

Aspect 52: A non-transitory computer-readable medium storing a set of instructions for wireless communication, the set of instructions comprising one or more instructions that, when executed by one or more processors of a device, cause the device to perform the method of one or more of Aspects 22-42.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
a memory; and
one or more processors, coupled to the memory, configured to:
receive, from a base station, an indication of at least one first beam and at least one first antenna panel of the UE, to use for one or more first transmissions, and of at least one second beam and at least one second antenna panel of the UE, to use for one or more second transmissions,
wherein the at least one first beam and the at least one second beam are associated with the base station and are a same beam, and the at least one first antenna panel and the at least one second antenna panel are different panels;
communicate the one or more first transmissions, with the base station, using the at least one first beam and the at least one first antenna panel; and
communicate the one or more second transmissions, with the base station, using the at least one second beam and the at least one second antenna panel.

2. The apparatus of claim 1, wherein the indication of the at least one first antenna panel, of the UE, includes one or more panel identifiers associated with the at least one first antenna panel, one or more beam group identifiers associated with the at least one first antenna panel, or one or more antenna port group identifiers associated with the at least one first antenna panel.

3. The apparatus of claim 1, wherein the indication of the at least one second antenna panel, of the UE, includes one or more panel identifiers associated with the at least one second antenna panel, one or more beam group identifiers associated with the at least one second antenna panel, or one or more antenna port group identifiers associated with the at least one second antenna panel.

4. The apparatus of claim 1, wherein the one or more first transmissions and the one or more second transmissions are configured by a same radio resource control (RRC) message, activated by a same medium access control (MAC) control element (MAC-CE) message, or scheduled by a same downlink control information (DCI) message.

5. The apparatus of claim 1, wherein the one or more first transmissions are associated with at least one first UE beam of the at least one first antenna panel of the UE, the one or more second transmissions are associated with at least one second UE beam of the at least one second antenna panel of the UE, and the at least one first UE beam and the at least one second UE beam are different beams.

6. The apparatus of claim 1, wherein the one or more first transmissions and the one or more second transmissions are downlink transmissions.

7. The apparatus of claim 6, wherein the one or more first transmissions and the one or more second transmissions include physical downlink control channel (PDCCH) transmissions, physical downlink shared channel (PDSCH) transmissions, channel state information reference signal (CSI-RS) transmissions, or a combination thereof.

8. The apparatus of claim 6, wherein the at least one first beam is a downlink beam or a joint uplink-downlink beam, and wherein the at least one second beam is a downlink beam or a joint uplink-downlink beam.

9. The apparatus of claim 1, wherein the one or more first transmissions and the one or more second transmissions are uplink transmissions.

10. The apparatus of claim 9, wherein the one or more first transmissions and the one or more second transmissions include physical uplink control channel (PUCCH) transmissions, physical uplink shared channel (PUSCH) transmissions, sounding reference signal (SRS) transmissions, physical random access channel (PRACH) transmissions, or a combination thereof.

11. The apparatus of claim 9, wherein the at least one first beam is an uplink beam, a joint uplink-downlink beam, or spatial relation information, and wherein the at least one second beam is an uplink beam, a joint uplink-downlink beam, or spatial relation information.

12. The apparatus of claim 1, wherein the one or more first transmissions and the one or more second transmissions are multiplexed in space, frequency, time, or a combination thereof.

13. The apparatus of claim 12, wherein the indication associates the at least one first antenna panel of the UE and the at least one second antenna panel of the UE with a multiplexing method.

14. The apparatus of claim 1, wherein the indication includes an index associated with a pattern that includes the at least one first beam associated with the at least one first antenna panel of the UE and the at least one second beam associated with the at least one second antenna panel of the UE.

15. The apparatus of claim 1, wherein the indication further associates at least one third beam with at least one third antenna panel of the UE, to use for the one or more first transmissions simultaneously with the at least one first beam and at least one first antenna panel of the UE.

16. The apparatus of claim 15, wherein the indication further associates at least one fourth beam with at least one fourth antenna panel of the UE, to use for the one or more second transmissions simultaneously with the at least one second beam and at least one second antenna panel of the UE.

17. The apparatus of claim 16, wherein the at least one first beam and the at least one second beam are associated with the base station and are the same beam, and wherein the at least one third beam and the at least one fourth beam are associated with the base station and are the same beam.

18. The apparatus of claim 17, wherein the one or more first transmissions are associated with at least one first UE beam of the at least one first antenna panel of the UE, the one or more second transmissions are associated with at least one second UE beam of the at least one second antenna panel of the UE, and the at least one first UE beam and the at least one second UE beam are different beams.

19. The apparatus of claim 1, wherein the indication includes scheduling information associated with the one or more first transmissions, the one or more first transmissions, or a combination thereof.

20. The apparatus of claim 1, wherein the one or more processors are further configured to:
transmit, to the base station, information associated with the at least one first antenna panel of the UE and the at least one second antenna panel of the UE,
wherein the indication is received based at in part on the information.

21. A method of wireless communication performed by a user equipment (UE), comprising:
receiving, from a base station, an indication of at least one first beam and at least one first antenna panel of the UE, to use for one or more first transmissions, and of at least one second beam and at least one second antenna panel of the UE, to use for one or more second transmissions,
wherein the at least one first beam and the at least one second beam are associated with the base station and are a same beam, and the at least one first antenna panel and the at least one second antenna panel are different panels;
communicating the one or more first transmissions, with the base station, using the at least one first beam and the at least one first antenna panel; and
communicating the one or more second transmissions, with the base station, using the at least one second beam and the at least one second antenna panel.

22. The method of claim 21, wherein the indication of the at least one first antenna panel, of the UE, includes one or more panel identifiers associated with the at least one first antenna panel, one or more beam group identifiers associated with the at least one first antenna panel, or one or more antenna port group identifiers associated with the at least one first antenna panel.

23. The method of claim 21, wherein the indication of the at least one second antenna panel, of the UE, includes one or more panel identifiers associated with the at least one second antenna panel, one or more beam group identifiers associated with the at least one second antenna panel, or one or more antenna port group identifiers associated with the at least one second antenna panel.

24. The method of claim 21, wherein the one or more first transmissions are associated with at least one first UE beam of the at least one first antenna panel of the UE, the one or more second transmissions are associated with at least one second UE beam of the at least one second antenna panel of the UE, and the at least one first UE beam and the at least one second UE beam are different beams.

25. The method of claim 21, wherein the indication further associates at least one third beam with at least one third antenna panel of the UE, to use for the one or more first transmissions simultaneously with the at least one first beam and at least one first antenna panel of the UE.

26. The method of claim 25, wherein the indication further associates at least one fourth beam with at least one fourth antenna panel of the UE, to use for the one or more second transmissions simultaneously with the at least one second beam and at least one second antenna panel of the UE.

27. An apparatus for wireless communication at a base station, comprising:
a memory; and
one or more processors, coupled to the memory, configured to:
transmit, to a user equipment (UE), an indication of at least one first beam and at least one first antenna panel of the UE, to use for one or more first transmissions, and of at least one second beam and at least one second antenna panel of the UE, to use for one or more second transmissions,
wherein the at least one first beam and the at least one second beam are associated with the base station and are a same beam, and the at least one first antenna panel and the at least one second antenna panel are different panels;
communicate the one or more first transmissions, with the UE, using the at least one first beam and the at least one first antenna panel; and
communicate the one or more second transmissions, with the UE, using the at least one second beam and the at least one second antenna panel.

28. The apparatus of claim 27, wherein the indication of the at least one first antenna panel includes one or more panel identifiers associated with the at least one first antenna panel, one or more beam group identifiers associated with the at least one first antenna panel, or one or more antenna port group identifiers associated with the at least one first antenna panel.

29. The apparatus of claim 27, wherein the indication of the at least one second antenna panel includes one or more panel identifiers associated with the at least one second antenna panel, one or more beam group identifiers associated with the at least one second antenna panel, or one or more antenna port group identifiers associated with the at least one second antenna panel.

30. A method of wireless communication performed by a base station, comprising:

transmitting, to a user equipment (UE), an indication of at least one first beam and at least one first antenna panel of the UE, to use for one or more first transmissions, and of at least one second beam and at least one second antenna panel of the UE, to use for one or more second transmissions,
  wherein the at least one first beam and the at least one second beam are associated with the base station and are a same beam, and the at least one first antenna panel and the at least one second antenna panel are different panels;
communicating the one or more first transmissions, with the UE, using the at least one first beam and the at least one first antenna panel; and
communicating the one or more second transmissions, with the UE, using the at least one second beam and the at least one second antenna panel.

* * * * *